United States Patent
Lee et al.

(10) Patent No.: US 12,335,334 B2
(45) Date of Patent: Jun. 17, 2025

(54) ELECTRONIC DEVICE FOR PERFORMING EDGE COMPUTING SERVICE AND ELECTRONIC DEVICE OPERATING METHOD

(71) Applicant: Samsung Electronics Co., Ltd., Suwon-si (KR)

(72) Inventors: Wonbo Lee, Suwon-si (KR); Youngwook Kim, Suwon-si (KR); Jinhyoung Kim, Suwon-si (KR); Taewan Kim, Suwon-si (KR); Hongshik Kim, Suwon-si (KR); Ansik Shin, Suwon-si (KR); Sangcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/313,681

(22) Filed: May 8, 2023

(65) Prior Publication Data
US 2023/0275960 A1    Aug. 31, 2023

Related U.S. Application Data

(63) Continuation of application No. PCT/KR2021/012899, filed on Sep. 17, 2021.

(30) Foreign Application Priority Data

Nov. 13, 2020    (KR) .................. 10-2020-0151885

(51) Int. Cl.
*H04L 67/1021*    (2022.01)

(52) U.S. Cl.
CPC .............................. *H04L 67/1021* (2013.01)

(58) Field of Classification Search
CPC ..... H04L 67/1021; H04L 65/40; H04L 67/10; H04L 67/51; H04L 67/52; H04L 67/101;
(Continued)

(56) References Cited

U.S. PATENT DOCUMENTS 10,506,033 B2    12/2019  Cui et al.
10,979,499 B2     4/2021  Seed et al.
(Continued)

FOREIGN PATENT DOCUMENTS

EP    3 713 274 A1     9/2020
KR    10-1661842 B1   10/2016
(Continued)

OTHER PUBLICATIONS

International Search Report with Written Opinion and English translation dated Dec. 20, 2021; International Appln. No. PCT/KR2021/012899.
(Continued)

*Primary Examiner* — Michael Won
(74) *Attorney, Agent, or Firm* — Jefferson IP Law, LLP

(57) ABSTRACT

An electronic device and a method performed by an electronic device are provided. The electronic device includes a memory for storing at least one of an application or an edge enabler client (EEC), a communication circuit to be used for connection between the electronic device and at least one of a first server, second servers, or third servers, and a processor, wherein the application is configured to perform a service supported by a third server, and the processor can be configured to receive access information for access to the second servers from the first server, select a second server to be accessed, based on information related to locations of the second servers and information related to location of the electronic device in in response to the information related to the locations of the second servers included in the access
(Continued)

information, and access the selected second server to perform the service.

16 Claims, 19 Drawing Sheets

(58) Field of Classification Search
CPC ............. H04L 67/1025; H04L 67/1029; H04L 67/289
See application file for complete search history.

(56) References Cited

U.S. PATENT DOCUMENTS

| | | | |
|---|---|---|---|
| 11,303,723 | B2 | 4/2022 | Johns |
| 11,419,150 | B2* | 8/2022 | Wakabayashi .......... G01S 19/05 |
| 2010/0208648 | A1 | 8/2010 | Narkar et al. |
| 2013/0100819 | A1* | 4/2013 | Anchan ................. H04W 48/20 |
| | | | 370/241 |
| 2014/0317176 | A1 | 10/2014 | Luecke et al. |
| 2015/0201320 | A1 | 7/2015 | Narkar et al. |
| 2019/0020657 | A1 | 1/2019 | Egner et al. |
| 2020/0007661 | A1 | 1/2020 | Kim |
| 2020/0106695 | A1 | 4/2020 | Rk et al. |
| 2020/0154459 | A1 | 5/2020 | Mukherjee et al. |
| 2020/0280822 | A1 | 9/2020 | Stammers et al. |
| 2020/0288332 | A1 | 9/2020 | Annambhotla |
| 2020/0329109 | A1 | 10/2020 | Ppallan et al. |
| 2020/0358673 | A1 | 11/2020 | Ren et al. |
| 2020/0389531 | A1* | 12/2020 | Lee ......................... H04L 67/51 |
| 2021/0050983 | A1* | 2/2021 | Manolakos ............ H04L 5/0048 |
| 2021/0136177 | A1* | 5/2021 | Hall ....................... H04L 67/289 |
| 2021/0243264 | A1* | 8/2021 | Yoon ....................... H04L 67/51 |
| 2021/0307089 | A1* | 9/2021 | Kim ........................ H04W 4/50 |
| 2021/0352113 | A1* | 11/2021 | Sodagar ............. H04N 21/2225 |
| 2021/0410102 | A1* | 12/2021 | Manolakos ......... H04W 64/006 |
| 2022/0022098 | A1* | 1/2022 | Kapadia ............ H04W 28/0942 |
| 2022/0124147 | A1* | 4/2022 | Ge ......................... H04L 67/563 |
| 2022/0166776 | A1* | 5/2022 | Lee ..................... H04L 63/0884 |
| 2022/0174585 | A1* | 6/2022 | Ge ......................... H04W 4/40 |
| 2022/0244344 | A1* | 8/2022 | Bao ........................ H04W 64/00 |
| 2022/0345442 | A1* | 10/2022 | Lee ......................... H04L 67/10 |
| 2023/0013720 | A1* | 1/2023 | Gupta ..................... H04W 4/50 |
| 2023/0239343 | A1* | 7/2023 | Ge ..................... H04L 67/1031 |
| | | | 709/203 |
| 2023/0269300 | A1* | 8/2023 | Roy .................... H04W 36/125 |
| 2023/0336791 | A1* | 10/2023 | Sodagar ................. H04L 65/61 |

FOREIGN PATENT DOCUMENTS

| | | |
|---|---|---|
| KR | 10-2019-0096873 A | 8/2019 |
| KR | 10-2020-0120565 A | 10/2020 |

OTHER PUBLICATIONS

Korean Office Action dated Dec. 6, 2024, issued in Korean Application No. 10-2020-0151885.

* cited by examiner

ELECTRONIC DEVICE FOR PERFORMING EDGE COMPUTING SERVICE AND ELECTRONIC DEVICE OPERATING METHOD

CROSS-REFERENCE TO RELATED APPLICATION(S)

This application is a continuation application, claiming priority under § 365(c), of an International application No. PCT/KR2021/012899, filed on Sep. 17, 2021, which is based on and claims the benefit of a Korean patent application number 10-2020-0151885, filed on Nov. 13, 2020, in the Korean Intellectual Property Office, the disclosure of which is incorporated by reference herein in its entirety.

BACKGROUND

1. Field

The disclosure relates to an electronic device and a method of operating the electronic device. More particularly, the disclosure relates to an electronic device performing an edge computing service.

2. Description of Related Art

As various electronic devices such as smartphones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic needs that are increasing after commercialization of a fourth generation (4G) communication system, efforts to develop a fifth generation (5G) communication system have been made. For this reason, the 5G communication system is called a beyond 4G network communication system or a post long term evolution (LTE) system. The 5G communication system considers implementation in a higher frequency band (for example, a band of 60 giga hertz (GHz)) other than a band of sixth generation (6G) or lower in order to meet a high data transmission rate. In the 5G communication system, technologies such as beamforming, massive multiple-input multiple-output (MIMO), full dimensional MIMO (FD-MIMO), array antenna, analog beam-forming, and large scale antenna are being discussed.

In the 5G communication system, various technologies are being proposed and implemented to realize a reduction in a transmission time or a reduction in a delay time. Among the implemented technologies, an edge computing service means a technology for implementing an edge network system in an area adjacent to a base station (BS) and providing various services through the edge network system implemented in the area adjacent to the BS to an electronic device connected to the BS. The edge service may reduce a distance between an electronic device of a user and a network.

The above information is presented as background information only to assist with an understanding of the disclosure. No determination has been made, and no assertion is made, as to whether any of the above might be applicable as prior art with regard to the disclosure.

SUMMARY

When the number of servers which can provide the same edge computing service, is plural, an electronic device capable of performing an edge computing service may select a server which can provide the edge computing server. It may be advantageous for the electronic device to select a server closest to the electronic device from among the plurality of servers in order to improve a quality or a speed of the edge computing service. In a situation in which an edge computing network providing the edge computing service can identify the location of the electronic device, the edge computing network may provide information on a server closest to the electronic device, and the electronic device may perform the edge computing service through the server closest to the electronic device by using the provided information.

However, a situation in which the edge computing network providing the edge computing service cannot identify the location of the electronic device may occur. For example, as the personal information protection act is tightened, the situation in which the edge computing network providing the edge computing service cannot collect information related to the location of the electronic device may occur. The edge computing network providing the edge computing service cannot provide information on a server closest to the electronic device since the location of the electronic device cannot be identified. In this case, even though the server closest to the electronic device exists, the electronic device may perform the edge computing service by using a server spaced far away from the electronic device.

Aspects of the disclosure are to address at least the above-mentioned problems and/or disadvantages and to provide at least the advantages described below. Accordingly, an aspect of the disclosure is to provide an electronic device performing an edge computing service.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store at least one of an application or an edge enabler client (EEC), a communication circuit configured to be used for connection between the electronic device and at least one of a first server, a plurality of second servers, or a plurality of third servers existing outside the electronic device, through a base station (BS), and a processor, wherein the application is configured to perform a service supported by a third server from among the plurality of third servers, and wherein the processor is configured to receive access information of the plurality of second servers for access to the plurality of second servers from the first server, select a second server to be accessed from among the plurality of second servers, based on information related to locations of the plurality of second servers and information related to a location of the electronic device in response to the information related to the locations of the plurality of second servers included in the access information of the plurality of second servers, and access the selected second server to perform the service.

In accordance with another aspect of the disclosure, a method performed by an electronic device is provided. The method includes receiving access information of a plurality of second servers for access to the plurality of second servers from a first server, selecting a second server to be accessed from among the plurality of second servers, based on information related to locations of the plurality of second servers and information related to a location of the electronic device in response to the information related to the locations of the plurality of second servers included in the access information of the plurality of second servers, and accessing the selected second server to perform a service.

An electronic device and a method of operating the electronic device according to various embodiments of the disclosure can receive information related to locations of second servers from a first server and select a second server to be connected on the basis of the information related to the locations of the second servers and information related to a location of the electronic device. Accordingly, the electronic device can be connected to a second server closest to the electronic device to receive an edge computing service at a relatively high speed.

An electronic device and a method of operating the electronic device according to various embodiments of the disclosure can receive information related to locations of third servers from second servers and select a third server to be connected on the basis of the information related to the locations of the third servers and information related to a location of the electronic device. Accordingly, the electronic device can be connected to a third server closest to the electronic device to receive an edge computing service at a relatively high speed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
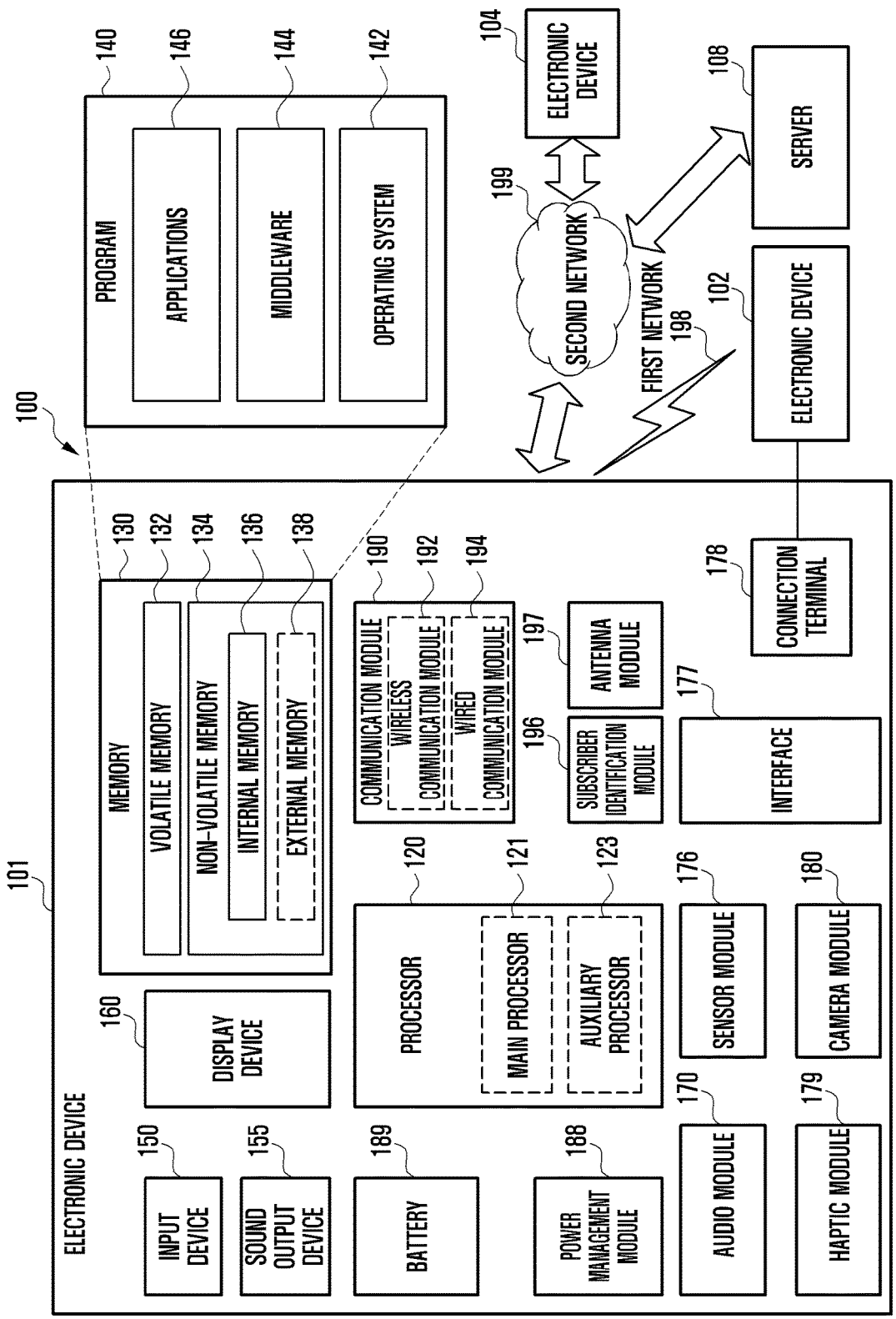
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or at least one application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS)

communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
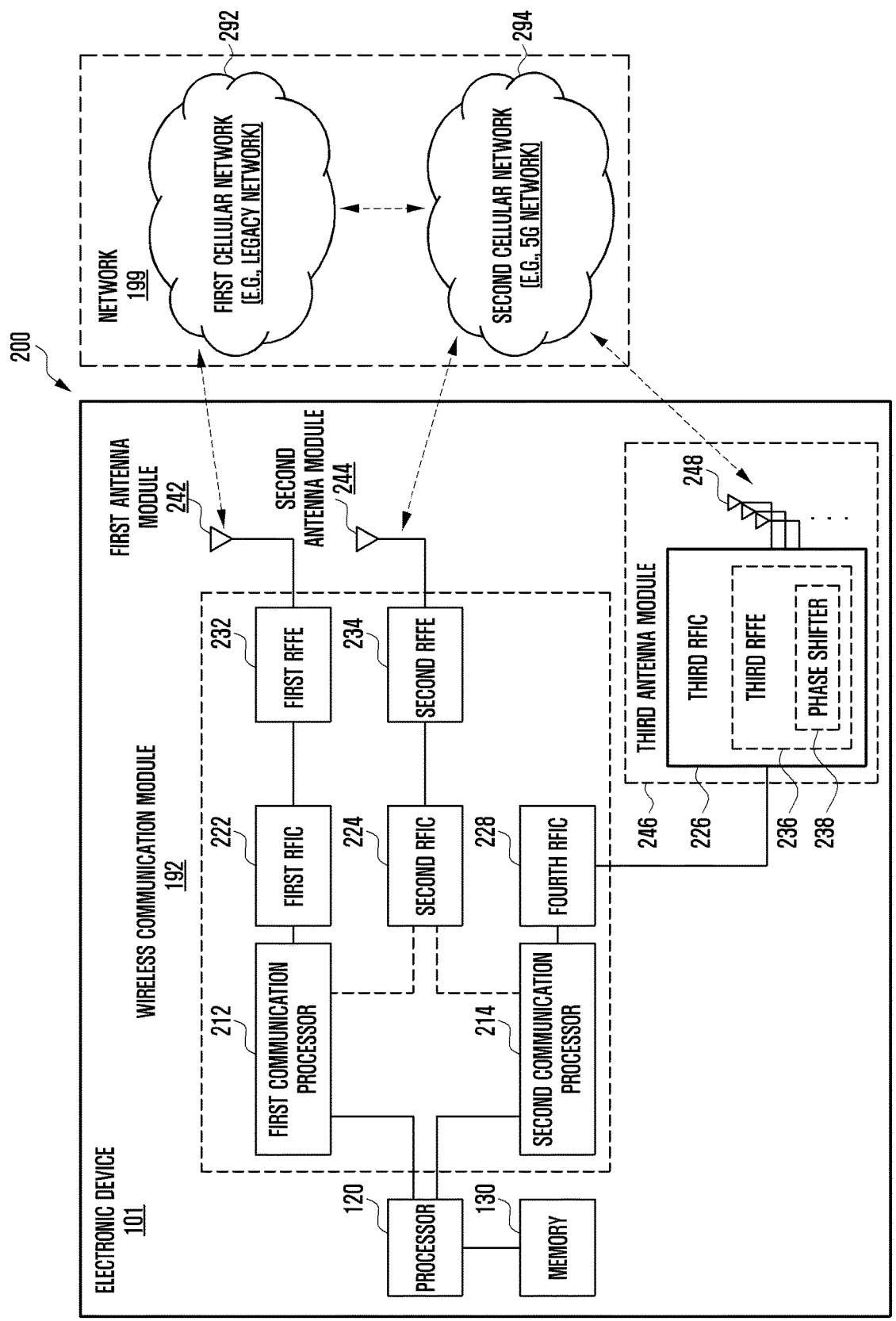
FIG. 2 is a block diagram of the electronic device according to an embodiment of the disclosure.

FIG. 2 is a block diagram illustrating an electronic device in a network environment 200 including a plurality of cellular networks according to an embodiment of the disclosure.

Referring to FIG. 2, the electronic device 101 in a network environment 200 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
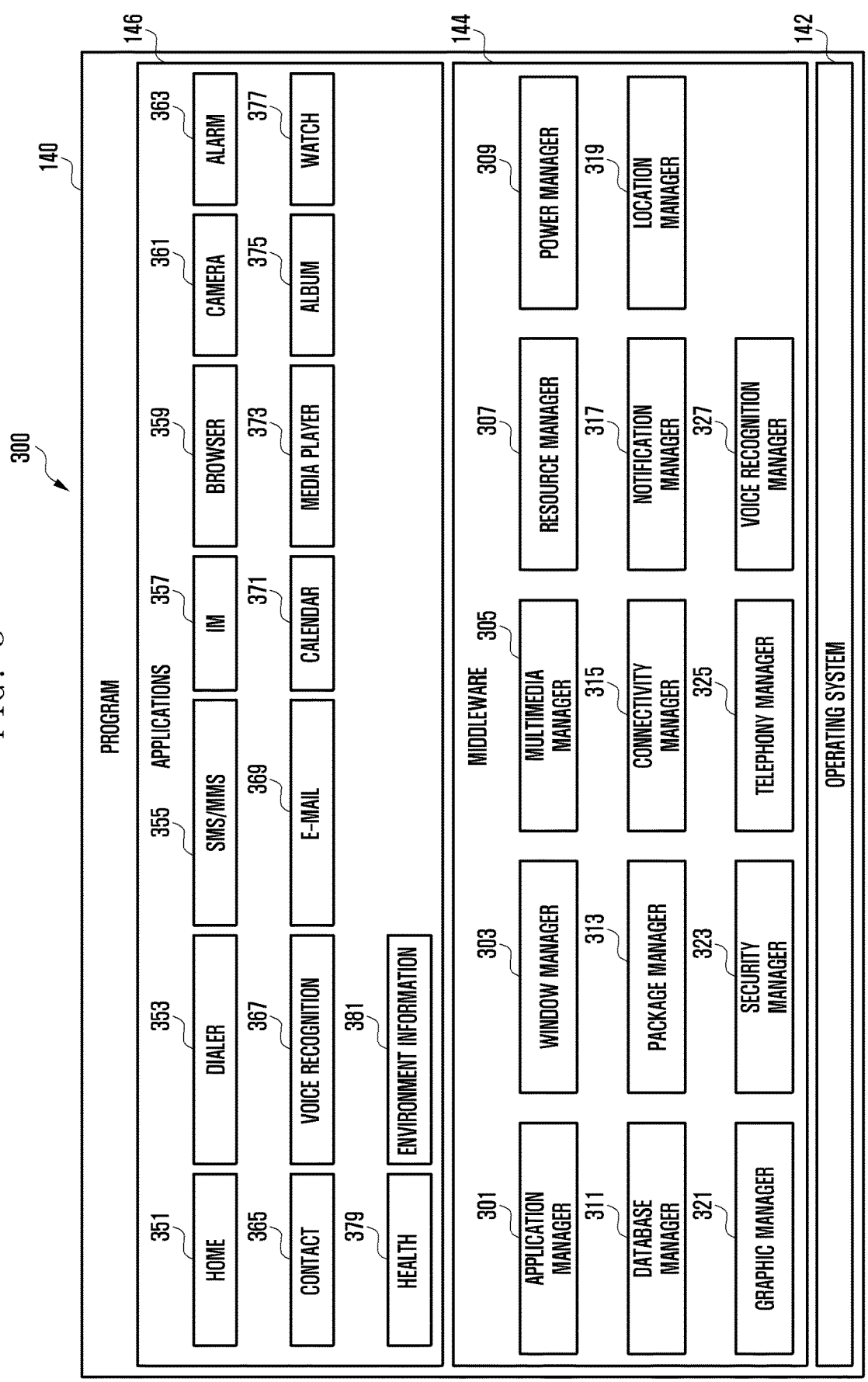
FIG. 3 is a block diagram illustrating a program according to an embodiment of the disclosure.

FIG. 3 is a block diagram 300 illustrating the program 140 according to an embodiment of the disclosure.

Referring to FIG. 3, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 4A:
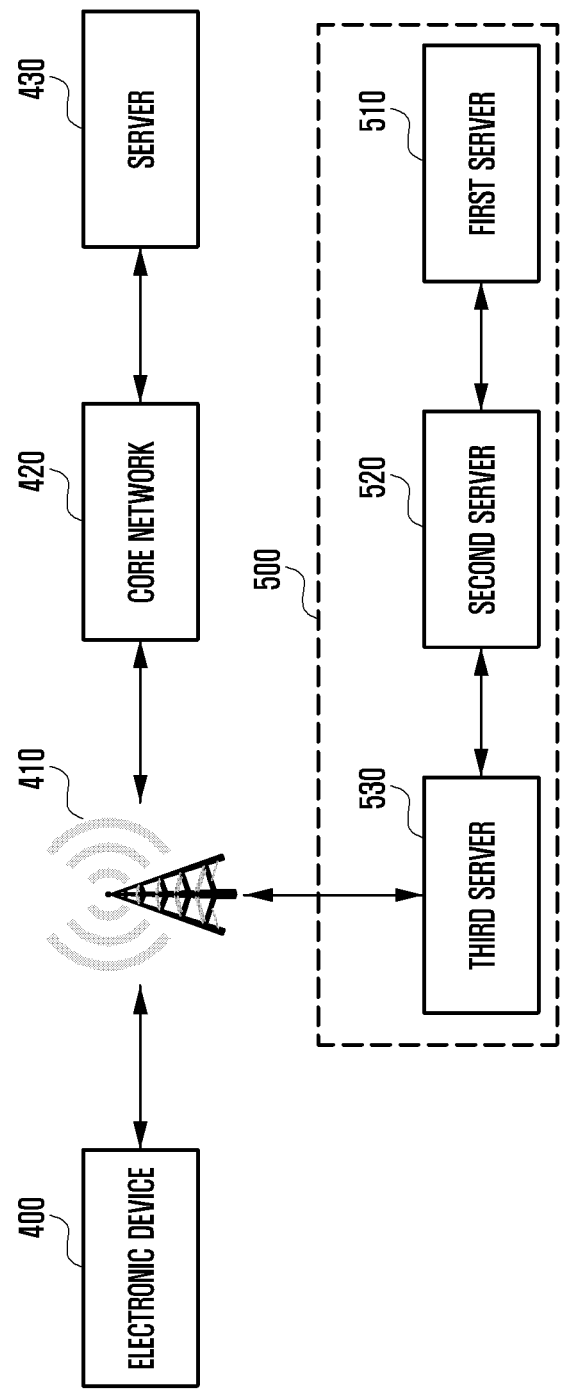
FIGS. 4A and 4B are block diagrams illustrating a network system according to various embodiments of the disclosure.

FIG. 4A is a block diagram illustrating a network system according to an embodiment of the disclosure.

FIG. 4A illustrates a network system through which an electronic device 400 uses an edge network system.

Referring to FIG. 4A, according to various embodiments of the disclosure, a network system may include the electronic device 400 (for example, the electronic device 101 of FIG. 1), a base station (BS) 410, a core network 420, a server 430, and/or an edge network system 500.

The electronic device 400 according to various embodiments of the disclosure may receive data provided by the server 430 or transmit data to the server through the BS 410 and the core network 420. The server 430 may be a server existing outside a network (for example, the BS 410 and the core network 420) operated by a cellular communication operator. According to an embodiment, a subject to operate the server 430 may be an operator different from the cellular communication operator.

In various embodiments of the disclosure, the electronic device 400 may transmit or receive control data or user data to or from the BS 410 while performing cellular communication. The cellular communication may be one communication scheme among various cellular communication schemes which can be supported by the electronic device 400. For example, the cellular communication may be one scheme among cellular communication through a first network (for example, the first network 198 of FIG. 1) (for example, long-term evolution (LTE), LTE-advanced (LTE-A), or LTE advanced pro (LTE-A-pro)), or cellular communication through a second network (for example, the second network 199 of FIG. 1) (for example, 5G on below 6 GHz or 5G on above 6 GHz).

According to various embodiments of the disclosure, the BS 410 may be wirelessly connected to the electronic device 400 and wiredly or wirelessly connected to the core network 420 and/or the edge network system 500 to configure a path for data transmission or reception between the electronic device 400 and the core network 420 and/or the edge network system 500. The BS 410 may transmit control data or user data transmitted by the core network 420 and/or the edge network system 500 to the electronic device 400. The BS 410 may transmit control data or user data transmitted by the electronic device 400 to the core network 420 and/or the edge network system 500. The control data may be data for controlling various operations by the electronic device 400 through cellular communication. The user data may be internet protocol (IP) data transmitted by the electronic device 400 through cellular communication. For example, the BS 410 may be defined as an evolved Node B (eNB) (or eNodeB) in a $4^{th}$-generation mobile communication scheme and a next-generation node B (gNB) (or gNodeB) in a 5th-generation mobile communication scheme.

According to various embodiments of the disclosure, the core network 420 may perform various functions (for example, call connection, IP data processing, authentication of the electronic device 400, processing of charging a cellular communication service used by the electronic device 400, management of mobility of the electronic device 400, or connection between the electronic device 400 and an external network) using cellular communication used by the electronic device 400. The core network 420 may be defined as an evolved packet core (EPC) in a $4^{th}$-generation mobile communication scheme and a 5G core (5GC) in a $5^{th}$-generation mobile communication scheme.

According to various embodiments of the disclosure, the core network 420 supporting the $5^{th}$-generation mobile communication may support various functions (for example, edge computing) compared to the core network supporting the $4^{th}$-generation mobile communication. Edge computing may be a technology for performing various services through the edge network system 500 implemented at a location physically close to the electronic device 400 (for example, a location physically close to the BS 410 or the inside of the BS 410) in order to implement a fast communication speed or a low latency time. The edge network system 500 may be implemented at the location physically close to the electronic device 400 compared to the server 430, and thus data communication through the edge network system 500 may realize a faster communication speed and/or a lower latency time than data communication through the core network 420. For example, the edge network system 500 may be directly connected to the core network 420, located physically close to the core network 420, or located within the core network 420.

According to various embodiments of the disclosure, a first server 510 may be a sever which provides information on at least one second server 520 to which the electronic device 400 can be connected. For example, information on the second server 520 may include access information of the second server 520 (for example, an IP address of the second server 520, access address information of the second server 520 including a domain name of the second server 520 and/or a uniform resource identifier (URI) of the second server 520, and an identifier of the second server 520). The first server 510 may be an element which is the same as or is similar to an edge data network configuration server (ECS) defined in TS 23.558.

According to various embodiments of the disclosure, the second server 520 may be a server which is connected to a third server 530 and manages various operations of the third server 530. The second server 520 may receive capability information of the third server 530 (for example, available resources of the third server 530 (for example, memory capacity or bandwidth)) from the third server 530. The second server 520 may transmit information on at least one third server 530 connected to the second server 520 in response to a request from the electronic device 400. The second server 520 may be elements that are the same as or are similar to an edge enabler server (EES) defined in TS 23.558.

Figure 5:
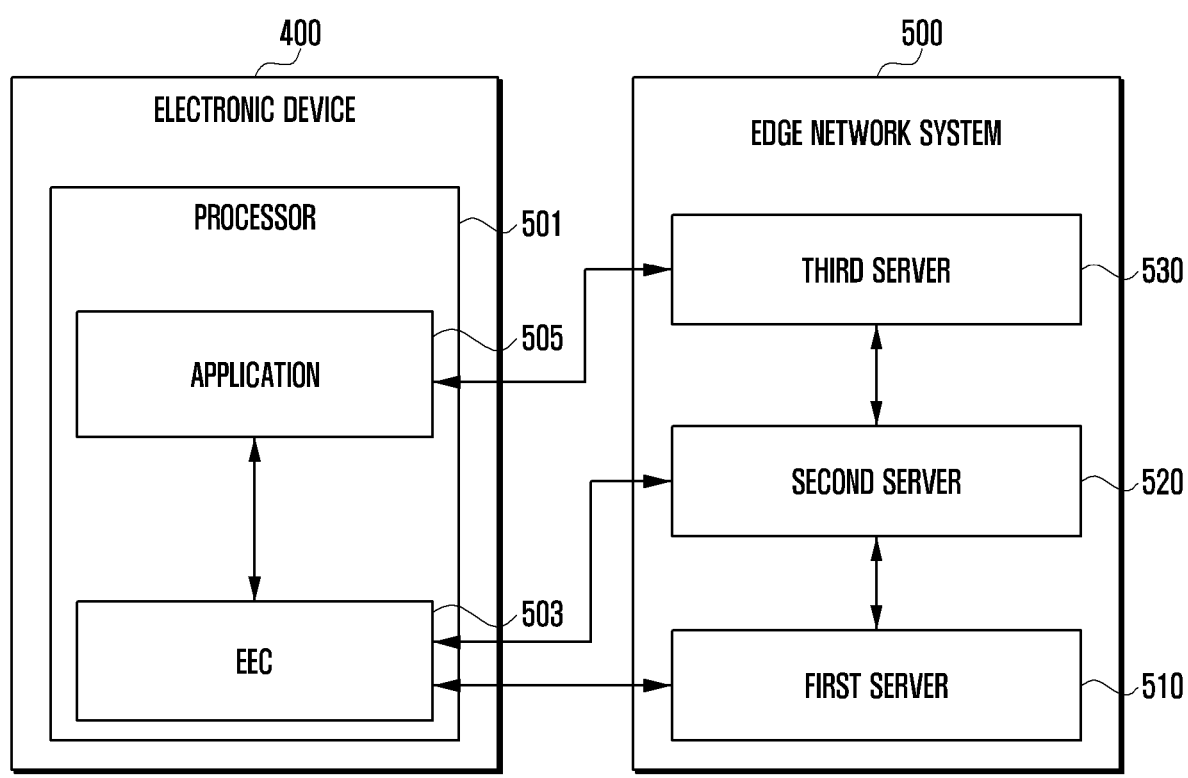
FIG. 5 illustrates an electronic device and an edge network according to an embodiment of the disclosure.

According to various embodiments of the disclosure, the third server 530 may be a server which provides an edge computing service which can be used by an application 505 installed in the electronic device 400. The third server 530 may provide application data related to the edge computing service to the application 505. The third server 530 may be an element that is the same as or is similar to an edge application server (EAS) defined in TS 23.558. Although FIG. 5 illustrates one third server 530, a plurality of third servers 530 may be disposed according to a provided service. At least one third server 530 may be deployed within the mobile communication network to provide the edge service to an adjacent user equipment (UE).

According to various embodiments of the disclosure, for the connection of the edge network system 500, the electronic device 400 may transmit a signal making a request for accessing the first server 510 to the core network 420. The core network 420 may transmit access information of the first server 510 to the electronic device 400 through various procedures (for example, the authentication operation of the electronic device 400).

In various embodiments of the disclosure, it is illustrated that all of the first server 510, the second server 520, and the third server 530 included in the edge network system 500 are deployed near the BS 410 (or near the electronic device 400) for convenience of description, but the disclosure is not limited thereto and various deployments may be possible. For example, the first server 510 and the second server 520 may be connected to the core network (for example, the core network 420 of FIG. 4A) or deployed adjacent to the core network, and the third server 530 may be deployed close to the electronic device 400 (for example, connected or adjacent to the BS 410). In another example, the first server 510 and the second server 520 may be deployed outside (for example, the Internet network) the mobile communication network (for example, the network including the BS 410 and the core network 420) operated by the cellular communication operator, and the third server 530 may be deployed at the location close to the electronic device 400. Alternatively, the first server 510 and the second server 520 may be implemented as an integrated single entity. It may be easily understood by those skilled in the art that elements included in the edge network system 500 may have various deployment forms if the edge network system 500 according to various embodiments includes at least one third server 530 which is deployed closer to the electronic device 400 than the external server 430 and can provide the edge service.

Figure 4B:
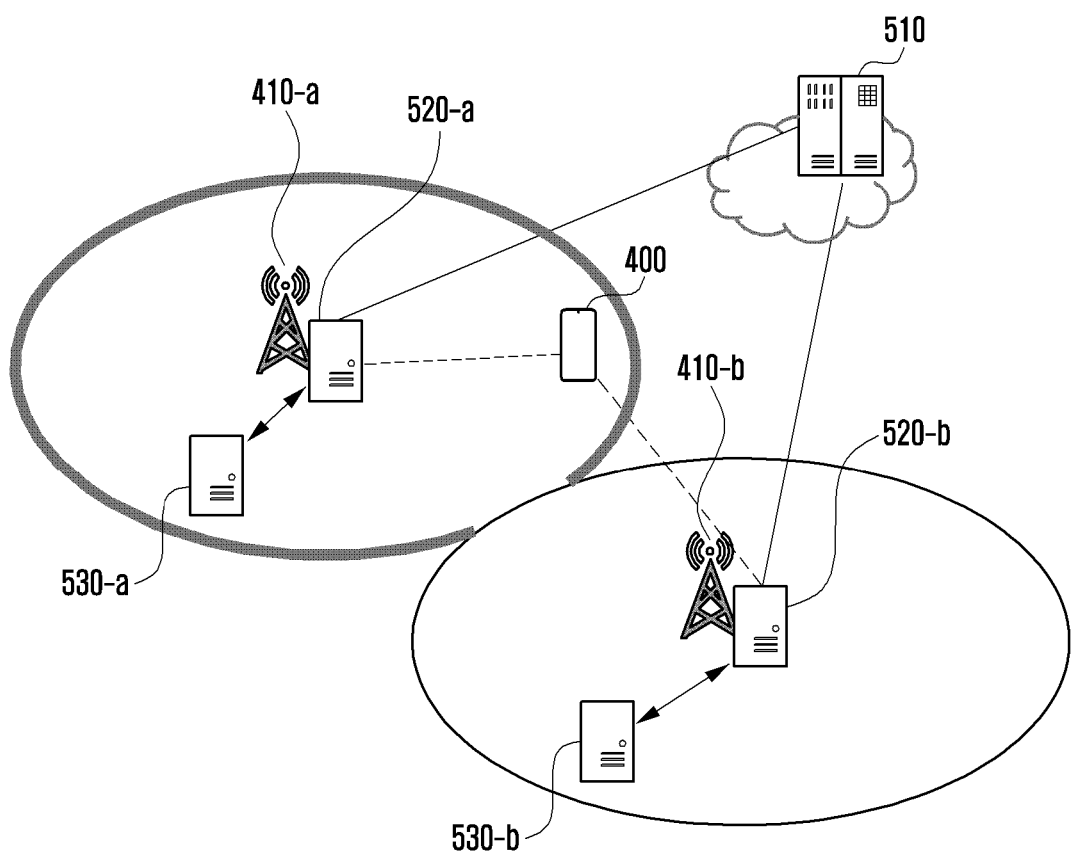

FIG. 4B illustrates an embodiment in which the electronic device selects one second server from among a plurality of second servers according to an embodiment of the disclosure.

According to various embodiments of the disclosure, the electronic device 400 may be connected to a first server (for example, the first server 510 of FIG. 4A) and perform a provisioning procedure for the edge service. The provisioning procedure may include an operation of transmitting a signal making a request for access information of the second server 520 to the first server 510. The first server 510 may transmit access information of the second server 520 (for example, at least one of identifiers of the second server 520, URI information of the second server 520, domain information of the second server 520, IP address information of the second server 520, access point name (APN) information corresponding to a dedicated public data network (PDN) or a packet data unit (PDU) when the dedicated PDN of the second server 520 or a PDU session exists, and/or data network name (DNN) information and/or information (for example, a token) used for verification of the valid connection of the second server 520) to the electronic device 400.

According to various embodiments of the disclosure, the electronic device 400 may receive access information of a plurality of second servers 520-a and 520-b from the first server 510. It may be appropriate that the electronic device 400 is connected to the second server (for example, the second server 520-a) close to the electronic device 400 and/or the third server (for example, the third server 530-a) close to the electronic device 400 in order to perform a relatively fast service.

When a core network (for example, the core network 420 of FIG. 4A) can identify information related to the location of the electronic device 400 (for example, location information through a global positioning system (GPS) sensor of the electronic device 400), the core network 420 may control the electronic device 400 to be connected to the second server 520-a closest to the electronic device 400. However, when the core network 420 cannot acquire location information of the electronic device 400 (for example, it is not possible for the core network 420 to acquire location information of the electronic device 400 as the personal information protection act is recently tightened), the core network 420 cannot identify the second server closest to the electronic device 400, and the electronic device 400 may be connected to the second server 520-b and/or the third server 530-b relatively far from the electronic device 400.

Hereinafter, a detailed embodiment in which the electronic device 400 makes the connection with the edge network closest to the electronic device 400 without transmitting location information of the electronic device 400 to the outside (for example, the core network 420) is described.

FIG. 5 illustrates the electronic device and the edge network system according to an embodiment of the disclosure.

According to various embodiments of the disclosure, the edge network system 500 may include the first server 510, the second servers 520 (or 520-a and 520-b of FIG. 4B), and/or the third server 530.

According to various embodiments of the disclosure, the third server 530 may be a server which provides the edge computing service which can be used by the application 505 installed in the electronic device 400. The third server 530 may provide application data related to the edge computing service to the application 505. The third server 530 may be an element that is the same as or is similar to an edge application server (EAS) defined in TS 23.558.

According to various embodiments of the disclosure, the second server 520-a or 520-b may be a server which is connected to the third server 530 and manage various operations of the third server 530. The second server 520-a or 520-b may receive capability information of the third server 530 (for example, available resources (for example, memory capacity or bandwidths)) from the third server 530. The second server 520-a or 520-b may transmit information on at least one third server 530 connected to the second server 520-a or 520-b in response to a request from the electronic device 400. The second server 520-a or 520-b may be an element that is the same as or is similar to an edge enabler server (EES) defined in TS 23.558.

According to various embodiments of the disclosure, the first server 510 may be a server which provides information on at least one second server 520-a and 520-b to which the electronic device 400 can be connected. For example, information on the second server 520-a or 520-b may include access information of the second server 520-a or 520-b (for example, an IP address of the second server 520-a or 520-b, access address information of the second server 520-a or 520-b including a domain name of the second server 520-a or 520-b and/or a uniform resource identifier (URI) of the second server 520-a or 520-b, and an identifier of the second server 520-a or 520-b). The first server 510 may be an element which is the same as or is similar to an edge data network configuration server (ECS) defined in TS 23.558.

According to various embodiments of the disclosure, the electronic device 400 may include a processor 501 (for example, the processor 120 of FIG. 1) and a memory (for example, the memory 130 of FIG. 1). The memory 130 may store various program modules which can be executed in the processor 120. The memory 130 may store an application 505 (for example, the application 146 of FIG. 1) which can perform the service using the edge network and various elements (for example, an edge enabler client (EEC) 503) for supporting edge computing. The processor 501 may load and execute (or operate) various program modules (for example, the EEC 503 and the application 505) stored in the memory 130. The EEC 503 may be implemented in an application layer (for example, the application 146 of FIG. 1), middleware (for example, the middleware 144 of FIG. 1), and/or an operating system (for example, the operating system 142 of FIG. 1).

According to various embodiments of the disclosure, the EEC 503 may identify the application 505 which can use the edge computing service among various applications executed (or operated) in the electronic device 400 and perform various operations of configuring the application 505 to transmit or receive data on the application 505 to or from the third server 530.

The EEC 503 may receive access information of elements of the edge network system 500 for allowing the application 505 to exchange application data through the edge network system 500 from the edge network system 500 and control the connection between the edge network system 500 and the electronic device 400 on the basis of the access information.

According to various embodiments of the disclosure, the EEC 503 may perform an operation of making the connection with the first server 510 on the basis of access information of the first server 510 received from the core network (For example, the network 420 of FIG. 4A. In another embodiment, the EEC 503 may perform an operation of making the connection with the first server 510 on the basis of access information of the first server 510 stored in the electronic device (for example, the memory 130 and/or a SIM card (for example, the subscriber identification module 196 of FIG. 1). The EEC 503 may transmit identification information of the electronic device 400 (for example, an international mobile subscriber identify (IMSI) and/or a generic public subscription identifier (GPSI) of the electronic device 400) to the first server 510, and the first server 510 may authenticate the electronic device 400 on the basis of the identification information of the electronic device 400.

According to various embodiments of the disclosure, after the connection with the first server 510 is completed, the EEC 503 may perform a provisioning procedure for the edge service. The provisioning procedure may include an operation of transmitting a signal making a request for access information of the second server 520-*a* or 520-*b* to the first server 510. The first server 510 may transmit access information of the second server 520 (for example, at least one of an identifier of the second server 520-*a* or 520-*b*, URI information of the second server 520-*a* or 520-*b*, domain information of the second server 520-*a* or 520-*b*, IP address information of the second server 520-*a* or 520-*b*, access point name (APN) information corresponding to a dedicated public data network (PDN) or a packet data unit (PDU) when the dedicated PDN of the edge network system 500 or a PDU session exists, and/or data network name (DNN) information and/or information (for example, a token) used for verification for the valid connection of the second server 520-*a* or 520-*b*) to the electronic device 400.

According to various embodiments of the disclosure, the access information of the second server 520-*a* or 520-*b* may be the same as or may be similar to an EES list defined in TS 23.558. For example, the access information of the second server 520-*a* or 520-*b* may be implemented as shown in Table 1 below and transmitted to the EEC 503. The access information of the second server 520-*a* or 520-*b* may include an identifiers of the second server 520-*a* or 520-*b* and/or access address information of the second server 520-*a* or 520-*b* (for example, URI information of the second server 520-*a* or 520-*b*, domain information of the second server 520-*a* or 520-*b*, IP address information of the second server 520-*a* or 520-*b*, access point name (APN) information corresponding to a dedicated public data network (PDN) or packet data unit (PDU) when the dedicated PDN or PDU of the edge network system 500 exists, and/or data network name (DNN) information).

TABLE 1

| Identifiers of second servers | Access address information |
|---|---|
| EES 1 | ees1.edge1.com |
| EES 2 | ees2. edge2.com |

According to various embodiments of the disclosure, access information of the second server 520-*a* or 520-*b* may include information related to locations of the second servers (for example, the second server 520-*a* or 520-*b* of FIG. 4B).

The information related to the location of the second server 520-*a* or 520-*b* may include location information of the second server 520-*a* or 520-*b*. According to an embodiment, the location information of the second server 520-*a* or 520-*b* may include latitude and longitude of the second server 520-*a* or 520-*b*. According to an embodiment, the location information of the second server 520-*a* or 520-*b* may include a mobile country code indicating a country in which the second server 520-*a* or 520-*b* is located or a mobile network code indicating an operator of the second server 520-*a* or 520-*b*.

The information related to the location of the second server 520-*a* or 520-*b* may include an identifier which can indicate locations of the second server 520-*a* or 520-*b*. According to an embodiment, the identifiers which can indicate the location of the second server 520-*a* or 520-*b* may be an identifier (cell ids) of a BS (for example, the BS 410-*a* or 410-*b* of FIG. 4B) connected to the second server 520-*a* or 520-*b* or a BS adjacent to the second server 520-*a* or 520-*b*, or a tracking area identification (TAI) of the second server 520-*a* or 520-*b*.

The information related to the location of the second server 520-*a* or 520-*b* may include a service radius of the second server 520-*a* or 520-*b*.

According to various embodiments of the disclosure, the information related to the location of the second server 520-*a* or 520-*b* may be included in access information of the second server 520. When the access information of the second server 520-*a* or 520-*b* includes the location information of the second server 520-*a* or 520-*b*, the access information of the second server 520-*a* or 520-*b* may be implemented as shown in Table 2.

TABLE 2

| Identifiers of second servers | Access address information | Information related to locations of second servers |
|---|---|---|
| EES 1 | ees1.edge1.com | Latitude and longitude (37.482321, 126.868355) |
| EES 2 | ees2. edge2.com | Cell ID(120212) |

According to various embodiments of the disclosure, the EEC 503 may select a second server to be accessed on the basis of the information related to the location of the second server 520-*a* or 520-*b* and information related to the location of the electronic device 400 in response to the information related to the location of the second server 520-*a* or 520-*b* included in the access information of the second server 520-*a* or 520-*b*.

According to various embodiments of the disclosure, the EEC 503 may compare the location information of the electronic device 400 with the location information of the second server 520-*a* or 520-*b* in response to the location information of the second server 520-*a* or 520-*b* included in the information related to the location of the second server 520-*a* or 520-*b* and may select the second server 520-*a* closest to the electronic device 400 as a second server to be accessed. When the service radius of the second server 520-*a* or 520-*b* are included in the location information of the second server 520-*a* or 520-*b*, the EEC 503 may select the second server 520-*a* included in the service radius of the second server 520-*a* or 520-*b* as the second server to be accessed by the electronic device 400.

According to various embodiments of the disclosure, the EEC 503 may compare an identifier of the BS 410-*a* connected to the electronic device 400 or the BS 410-*b* adjacent to the electronic device 400 with identifiers of the BSs 410-*a* and 410-*b* connected or adjacent to the second server 520-*a* or 520-*b* in response to the identifiers indicating the location of the second server 520-*a* or 520-*b* included in the information related to the location of the second server 520-*a* or 520-*b*. In response to identification that the identifiers match, the EEC 503 may select the second server 520-*a* corresponding to the matching identifier as the second server to be accessed.

According to various embodiments of the disclosure, the EEC 503 may identify an identifier of the BS 410-*a* or 410-*b* connected or adjacent to the second server 520-*a* or 520-*b* and identify the strength of signals output (or broadcasted) by the adjacent BSs 410-*a* and 410-*b*. The EEC 503 may select the second server 520-*a* connected or adjacent to the BS (for example, 410-*a*) having the higher signal strength as the second server to be accessed. For example, the EEC 503 may identify at least one of reference signal received power (RSRP), received signal strength indicator (RSSI), reference signal received quality (RSRQ), signal to interference noise ratio (SINT), signal to noise ratio (SNR) of the signal broadcasted by the BS and select the second server 520-*a* connected or adjacent to the BS (for example, 410-*a*) having the higher signal strength as the second server to be accessed.

According to various embodiments of the disclosure, the EEC 503 may compare a TAI of the electronic device 400 with a TAI of the second server 520-*a* or 520-*b* in response to the identifier indicating the location of the second server 520-*a* or 520-*b* included in the information related to the location of the second server 520-*a* or 520-*b*. In response to identification that the TAIs match, the EEC 503 may select the second server 520-*a* corresponding to the matching TAI as the second server to be accessed.

According to various embodiments of the disclosure, the EEC 503 may compare a mobile cloud computing (MCC) or (mobile network code (MNC)) of the electronic device 400 with an MCC (or MNC) of the second server 520-*a* or 520-*b* in response to the identifier indicating the country in which the second server 520-*a* or 520-*b* are located or the operator thereof included in the information related to the location of the second server 520-*a* or 520-*b*. The EEC 503 may select the second server 520-*a* having the matching MCC (or MNC) as the second server to be accessed.

According to various embodiments of the disclosure, the EEC 503 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The EEC 503 may transmit a test signal (for example, a ping signal) to each of the second servers 520-*a* and 520-*b* and measure the RTT on the basis of a time at which a response signal corresponding to the test signal is received. The EEC 503 may select the second server 520-*a* having the smallest RTT among a plurality of second servers 520-*a* and 520-*b* as the second server to be accessed.

According to various embodiments of the disclosure, when an IP address of the second server 520-*a* or 520-*b* is included in the access address information of the second server 520-*a* or 520-*b* received from the first server 510, the EEC 503 may select the second server 520-*a* closest to the electronic device 400 on the basis of the IP addresses. According to an embodiment, the EEC 503 may compare IP subnet prefixes generated on the basis of the IP addresses with an IP subnet prefix of the electronic device 400 and select the second server 520-*a* having the IP subnet prefix which is the same as the IP subnet prefix of the electronic device 400 as the second server to be accessed.

According to various embodiments of the disclosure, the EEC 503 may attempt access to the selected second server 520-*a* on the basis of access information (for example, the EES identifier and access address information) of the selected second server 520-*a* received from the first server 510. The second server 520-*a* may identify whether the electronic device 400 is an electronic device having a right to access the second server 520-*a* on the basis of access information (for example, the token) of the second server 520-*a* transmitted by the EEC 503 and determine whether to allow access (or connection) of the electronic device 400 on the basis of the identification result. For example, the second server 520-*a* may determine whether to allow access (or connection) of the electronic device 400 to the second server 520-*a* by an authentication operation through the received token with an authentication server (not shown). In this case, the token may be information which the authentication server (not shown) transmits to the electronic device 400.

According to various embodiments of the disclosure, the EEC 503 may perform an edge service discovery procedure (for example, a procedure of discovering service information which can be executed by edge server(s)) for acquiring information on the third server 530 which can provide the edge computing service to the application 505. The EEC 503 may transmit an edge service discovery request message making a request for access information of at least one third server 530 connected to the second server 520-*a* to the second server 520. The second server 520-*a* may transmit an edge service discovery response message including access information of the third server 530 stored by the second server 520 to the EEC 503.

The access information of the third server 530 may include an identifier (edge application server identification (EASID)) of the third server 530, an identifier (atomicity, consistency, isolation, durability (ACID)) of an application installed in the electronic device 400, and/or access address information of the third server 530 (for example, the IP address of the third server 530 and the domain name of the third server 530).

According to various embodiments of the disclosure, the third server 530 may be a software entity implemented in units of services. For example, a plurality of third servers 530 are entities implemented in one physical server and may be servers which provide different services. In this case, the access information of the third server 530 may include access information of applications which can be executed in the third server 530 and/or identifiers of applications which are installed in the electronic device 400 and can perform the service using the third server 530. The identifier of the service which the third server 530 can provide may be an identifier of the application installed in the third server 530.

According to various embodiments of the disclosure, the access information of the third server 530 may be the same as or may be similar to an EAS list defined in TS 23.558. Information on the third server 530 may be implemented as shown in Table 3 below and transmitted to the EEC 503.

TABLE 3

| Identifier of third server | Identifier (ACID) of application installed in electronic device | Access address information |
|---|---|---|
| EAS1 | com.android.app1 | ees1.edge1.com |
| EAS2 | com.android.app2 | 2.2.2.2 |
| EAS3 | com.android.app3 | ees3.edge3.com/3.3.3.3 |

The access information of the second server 530 included in Table 3 may include the identifier of the third server 530 and/or the identifier (ACID) of the application executed in the electronic device 400. For example, respective rows (for example, EAS1, EAS2, and EAS3) of Table 2 indicate identifiers and access addresses for a first server application and a second server application which can be executed in the third server 530.

According to various embodiments of the disclosure, the identifier of the third server 530 is an identifier of the application executed in the third server 530 and may be a value distinguished for each service application which can be executed in the third server 530. When the number of service applications which can be executed by the third server 530 is plural, the third server 530 may have a plurality of identifiers of the third server 530. When the number of applications which can be executed by the third server 530 is one, the third server 530 may have one identifier of the third server 530, and the identifier of the third server 530 may be exchangeable with an identifier of the application executed in the third server 530.

According to various embodiments of the disclosure, the EEC 503 may search for the third server 530 which can provide a service available by the application 505 in the access information of the third server 530 in response to reception of a service connection request from the application 505 using the third server 530. The EEC 503 may identify an application identifier (for example, com.android.app1) that matches an application identifier (for example, com.android.app1) that matches the application identifier (for example, com.android.app1) to be used by the application 505 among application identifiers (for example, com.android.app1 and com.android.app2) included in the identifier of the third server 530 and transmit a domain name (for example, app1.edge.com) or an IP address (for example, 3.3.3.1) of the third server 530 corresponding to the identified application identifier (for example, com.android.app1) to the application 505. The application 505 may make the connection with the third server 530 on the basis of the received domain name or IP address of the third server 530 and perform the service using the third server 530.

According to various embodiments of the disclosure, when the number of third servers (for example, the third servers 530-*a* and 530-*b* of FIG. 4B) which provide the service available by the application 505 is plural, the EEC 503 may select the third server (for example, 530-*a*) to be accessed on the basis of information related to locations of the third servers 530-*a* and 530-*b* and information related to the location of the electronic device 400.

According to various embodiments of the disclosure, the access information of the third servers 530-*a* and 530-*b* may include information related to the locations of the third servers 530-*a* and 530-*b*.

The information related to the locations of the third servers 530-*a* and 530-*b* may include location information of the third servers 530-*a* and 530-*b*. According to an embodiment, the location information of the third servers 530-*a* and 530-*b* may include latitude and longitude of the third servers 530-*a* and 530-*b*. According to an embodiment, the location information of the third servers 530-*a* and 530-*b* may include a mobile country code indicating a country in which the third servers 530-*a* and 530-*b* are located or a mobile network code indicating an operator of the third servers 530-*a* and 530-*b*.

The information related to the locations of the third servers 530-*a* and 530-*b* may include identifiers which can indicate locations of the third servers 530-*a* and 530-*b*. According to an embodiment, the identifiers which can indicate the locations of the third servers 530-*a* and 530-*b* may be identifiers (cell ids) of BSs (for example, the BSs 410-*a* and 410-*b* of FIG. 4B) connected to the second third servers 530-*a* and 530-*b* or BSs adjacent to the third servers 530-*a* and 530-*b*, or tracking area identifications (TAIs) of the third servers 530-*a* and 530-*b*.

The information related to the locations of the third servers 530-*a* and 530-*b* may include service radiuses of the third servers 530-*a* and 530-*b*.

According to various embodiments of the disclosure, the information related to the locations of the third servers 530-*a* and 530-*b* may be included in access information of the third server 530. When the access information of the third servers 530-*a* and 530-*b* includes the location information of the third servers 530-*a* and 530-*b*, the access information of the third servers 530-*a* and 530-*b* may be implemented as shown in Table 4.

TABLE 4

| Identifiers of third servers | Identifier of application installed in electronic device (ACID) | Access address information | Information related to locations of third servers |
|---|---|---|---|
| EAS1 | com.android.app1 | ees1.edge1.com | Latitude and longitude (38.482321, 127.868355) |
| EAS2 | com.android.app2 | 2.2.2.2 | Cell ID(120212) |

According to various embodiments of the disclosure, the EEC 503 may select the second server to be accessed on the basis of information related to the locations of the third servers 530-*a* and 530-*b* and information related to the location of the electronic device 400 in response to the information related to the third servers 530-*a* and 530-*b* included in the access information of the third servers 530-*a* and 530-*b*.

According to various embodiments of the disclosure, the EEC 503 may compare the location information of the electronic device 400 with the location information of the third servers 530-*a* and 530-*b* in response to the location information of the third servers 530-*a* and 530-*b* included in the information related to the locations of the third servers 530-*a* and 530-*b* and may select the third server 530-*a* closest to the electronic device 400 as the third server to be accessed. When the service radiuses of the third servers 530-*a* and 530-*b* are included in the location information of the third servers 530-*a* and 530-*b*, the EEC 503 may select the third server 530-*a* included in the service radiuses of the third servers 530-*a* and 530-*b* as the third server to be accessed by the electronic device 400.

According to various embodiments of the disclosure, the EEC 503 may compare an identifier of the BS 410-*a* connected to the electronic device 400 or the BS 410-*b* adjacent to the electronic device 400 with identifiers of the BSs 410-*a* and 410-*b* connected or adjacent to the third servers 530-*a* and 530-*b* in response to the identifiers indicating the locations of the third servers 530-*a* and 530-*b* included in the information related to the locations of the third servers 530-*a* and 530-*b*. In response to identification that the identifiers match, the EEC 503 may select the third server 530-*a* corresponding to the matching identifier as the third server to be accessed.

According to various embodiments of the disclosure, the EEC 503 may identify identifiers of the BSs 410-*a* and 410-*b* connected or adjacent to the third servers 530-*a* and 530-*b* and identify the strength of signals output (or broadcasted) by the adjacent BSs 410-*a* and 410-*b* on the basis of the identified identifiers. The EEC 503 may select the third server 530-*a* connected or adjacent to the BS (for example, 410-*a*) having the higher signal strength as the second server to be accessed.

According to various embodiments of the disclosure, the EEC 503 may compare the TAI of the electronic device 400 with the TAIs of the third servers 530-*a* and 530-*b* in response to the identifier indicating the locations of the third servers 530-*a* and 530-*b* included in the information related to the locations of the third servers 530-*a* and 530-*b*. In response to identification that the TAIs match, the EEC 503 may select the third server 530-*a* corresponding to the matching TAI as the third server to be accessed.

According to various embodiments of the disclosure, the EEC 503 may compare a MCC or (MNC) of the electronic device 400 with MCCs (or MNCs) of the third servers 530-*a* and 530-*b* in response to the identifier indicating the country in which the third servers 530-*a* and 530-*b* are located or the operator thereof included in the information related to the locations of the third servers 530-*a* and 530-*b*. The EEC 503 may select the third server 530-*a* having the matching MCC (or MNC) as the third server to be accessed.

According to various embodiments of the disclosure, the EEC 503 may make the connection with the third servers 530-*a* and 530-*b* on the basis of access address information of the third servers 530-*a* and 530-*b* received from the first server 510 and measure a round trip time (RTT) between each of the third servers 530-*a* and 530-*b* and the electronic device 400. According to an embodiment, the EEC 503 may transmit a test signal (for example, a ping signal) to each of the third servers 530-*a* and 530-*b* and measure the RTT on the basis of a time at which a response signal corresponding to the test signal is received. The EEC 503 may select the third server 530-*a* having the smallest RTT among a plurality of third servers 530-*a* and 530-*b* as the second server to be accessed.

According to various embodiments, when IP addresses of the third servers 530-*a* and 530-*b* are included in access address information of the third servers 530-*a* and 530-*b* received from the second server 520-*a*, the EEC 503 may select the third server 530-*a* closest to the electronic device 400 on the basis of the IP addresses. According to an embodiment, the EEC 503 may compare IP subnet prefixes generated on the basis of the IP addresses of the third servers 530-*a* and 530-*b* with an IP subnet prefix of the electronic device 400 and select the third server 530-*a* having the IP subnet prefix which is the same as the IP subnet prefix of the electronic device 400 as the second server to be accessed.

Although FIG. 5 illustrates that the processor 501 and/or the application 505 are directly connected to the edge network system 500, the processor 501 and/or the application 505 may exchange data with the edge network system 500 through elements for communication of the electronic device 101 (for example, the wireless communication module 192 of FIG. 1).

According to various embodiments of the disclosure, the EEC 503 may change the second server 520-*a* or 520-*b* to be accessed according to movement of the electronic device 400. For example, when the electronic device 400 escapes the service radius of the second server 520-*a* and enters the service radius of the second server 520-*b*, the EEC 503 may change the second server 520-*b* to be accessed. The operation of the EEC 503 according to movement of the electronic device 400 is described with reference to FIGS. 9A to 9G.

Figure 6:
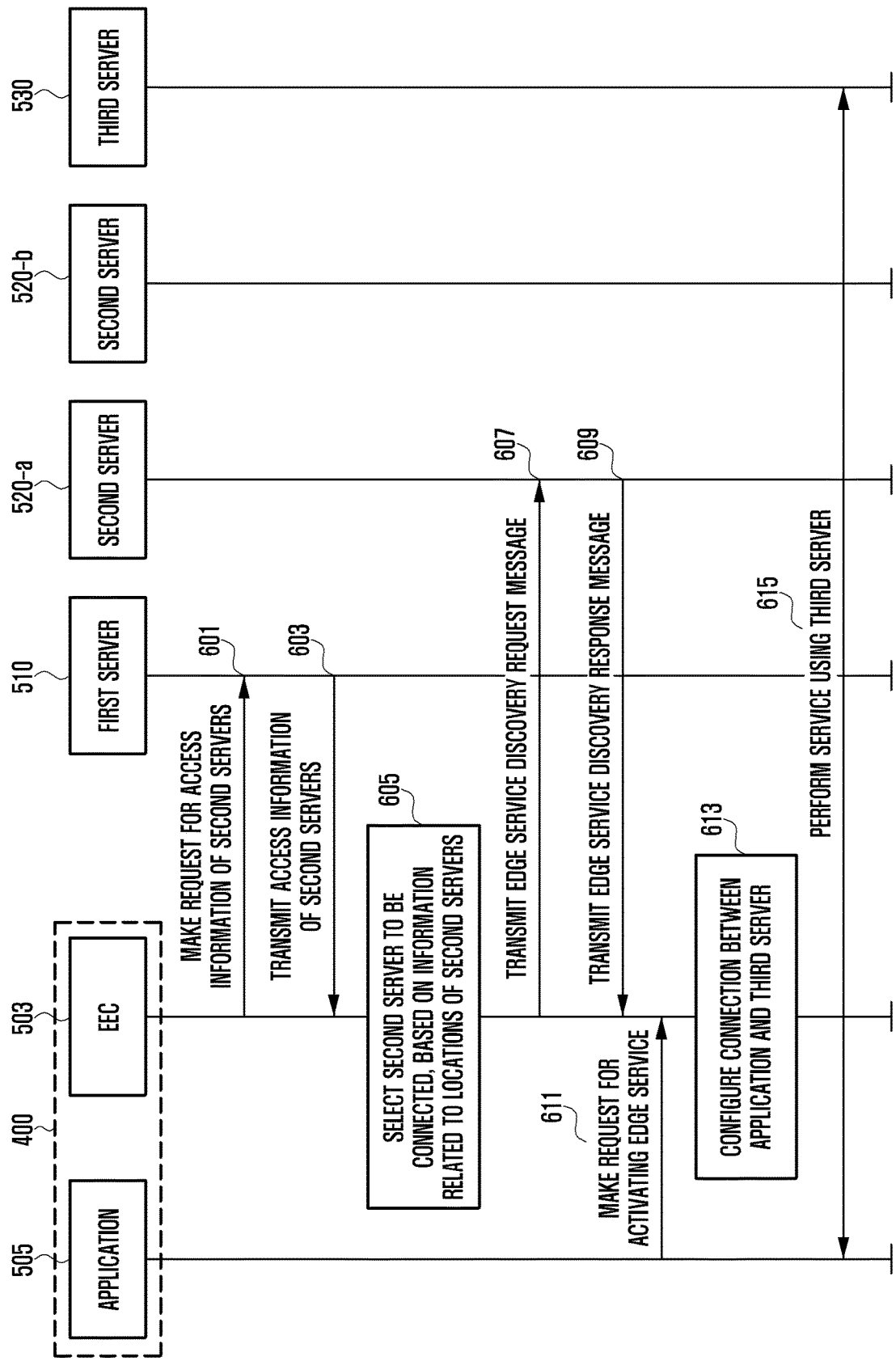
FIG. 6 illustrates an embodiment in which the electronic device selects one second server from among a plurality of second servers according to an embodiment of the disclosure.

FIG. 6 illustrates an embodiment in which the electronic device selects one second server from among a plurality of second servers according to an embodiment of the disclosure.

Referring to FIG. 6, in operation 601, an EEC (for example, the edge enabler client 503 of FIG. 5) of an electronic device (for example, the electronic device 400 of FIG. 4A) may transmit a signal making a request for access information of second server 520-*a* or 520-*b* (for example, the second server 520 of FIG. 5) to a first server (for example, the first server 510 of FIG. 5).

According to various embodiments of the disclosure, the EEC 503 may perform an operation of making the connection to the first server 510 on the basis of access information of the first server 510 received from the core network (For example, the network 420 of FIG. 4A. In another embodiment, the EEC 503 may perform an operation of making the connection with the first server 510 on the basis of access information of the first server 510 stored in the electronic device (for example, the memory 130 and/or a SIM card (for example, the subscriber identification module 196 of FIG. 1). The EEC 503 may transmit identification information of the electronic device 400 (for example, an international mobile subscriber identify (OMSI) and/or a generic public subscription identifier (GPSI) of the electronic device 400) to the first server 510, and the first server 510 may authenticate the electronic device 400 on the basis of the identification information of the electronic device 400.

According to various embodiments of the disclosure, after the connection with the first server 510 is completed, the EEC 503 may perform a provisioning procedure for the edge service. The provisioning procedure may include an operation of transmitting a signal making a request for access information of the second server 520-*a* or 520-*b* to the first server 510.

According to various embodiments of the disclosure, in operation 603, the first server 510 may transmit access information of a plurality of second servers 520-*a* and 520-*b* connected to the first server in response to reception of an access information request for the second server 520-*a* or 520-*b*.

According to various embodiments of the disclosure, the first server 510 may transmit access information of the second server 520 (for example, at least one of an identifier of the second server 520-*a* or 520-*b*, URI information of the second server 520-*a* or 520-*b*, domain information of the second server 520-*a* or 520-*b*, IP address information of the second server 520-*a* or 520-*b*, access point name (APN) information corresponding to a dedicated public data network (PDN) or a packet data unit (PDU) when the dedicated PDN of the edge network system 500 or a PDU session exists, and/or data network name (DNN) information and/or information (for example, a token) used for verification for the valid connection of the second server 520-*a* or 520-*b*) to the electronic device 400.

According to various embodiments of the disclosure, access information of the second server 520-*a* or 520-*b* may include information related to the location of the second server (for example, the second server 520-*a* or 520-*b* of FIG. 4B).

The information related to the location of the second server 520-*a* or 520-*b* may include location information of the second server 520-*a* or 520-*b*. According to an embodiment, the location information of the second server 520-*a* or 520-*b* may include latitude and longitude of the second server 520-*a* or 520-*b*. According to an embodiment, the location information of the second server 520-*a* or 520-*b* may include a mobile country code indicating a country in which the second server 520-*a* or 520-*b* are located or a mobile network code indicating an operator of the second server 520-*a* or 520-*b*.

The information related to the location of the second server 520-*a* or 520-*b* may include identifiers which can indicate the location of the second server 520-*a* or 520-*b*. According to an embodiment, the identifiers which can indicate the location of the second server 520-*a* or 520-*b* may be an identifier (cell ids) of the BS (for example, the BS 410-*a* or 410-*b* of FIG. 4B) connected to the second server 520-*a* or 520-*b* or the BS adjacent to the second server 520-*a* or 520-*b*, or a tracking area identifications (TAI) of the second server 520-*a* or 520-*b*.

The information related to the location of the second server 520-*a* or 520-*b* may include service radius of the second server 520-*a* or 520-*b*.

According to various embodiments of the disclosure, the information related to the location of the second server 520-a or 520-b may be included in access information of the second servers 520.

According to various embodiments of the disclosure, in operation 605, the electronic device 400 may select the second server to be accessed on the basis of information related to the location of the second server 520-a or 520-b.

According to various embodiments of the disclosure, the EEC 503 may select a second server to be accessed on the basis of the information related to the location of the second server 520-a or 520-b and information related to the location of the electronic device 400 in response to the information related to the location of the second server 520-a or 520-b included in the access information of the second server 520-a or 520-b.

According to various embodiments of the disclosure, the EEC 503 may compare the location information of the electronic device 400 with the location information of the second server 520-a or 520-b in response to the location information of the second server 520-a or 520-b included in the information related to the location of the second server 520-a or 520-b and may select the second server 520-a closest to the electronic device 400 as a second server to be accessed. When the service radius of the second server 520-a or 520-b are included in the location information of the second server 520-a or 520-b, the EEC 503 may select the second server 520-a included in the service radius of the second server 520-a or 520-b as the second server to be accessed by the electronic device 400.

According to various embodiments of the disclosure, the EEC 503 may compare an identifier of the BS 410-a connected to the electronic device 400 or the BS 410-b adjacent to the electronic device 400 with an identifier of the BS 410-a or 410-b connected or adjacent to the second server 520-a or 520-b in response to the identifier indicating the location of the second server 520-a or 520-b included in the information related to the location of the second server 520-a or 520-b. In response to identification that the identifiers match, the EEC 503 may select the second server 520-a corresponding to the matching identifier as the second server to be accessed.

According to various embodiments of the disclosure, the EEC 503 may compare the TAI of the electronic device 400 with the TAI of the second server 520-a or 520-b in response to the identifier indicating the location of the second server 520-a or 520-b included in the information related to the location of the second server 520-a or 520-b. In response to identification that the TAIs match, the EEC 503 may select the second server 520-a corresponding to the matching TAI as the second server to be accessed.

According to various embodiments of the disclosure, the EEC 503 may compare a MCC or (MNC) of the electronic device 400 with an MCC (or MNC) of the second server 520-a or 520-b in response to the identifier indicating the country in which the second server 520-a or 520-b is located or the operator thereof included in the information related to the location of the second server 520-a or 520-b. The EEC 503 may select the second server 520-a having the matching MCC (or MNC) as the second server to be accessed.

According to various embodiments of the disclosure, the EEC 503 may make the connection with the second server 520-a or 520-b on the basis of access address information of the second server 520-a or 520-b received from the first server 510 and measure a round trip time (RTT) of each of the second servers 520-a and 520-b. The EEC 503 may transmit a test signal (for example, a ping signal) to each of the second servers 520-a and 520-b and measure the RTT on the basis of a time at which a response signal corresponding to the test signal is received. The EEC 503 may select the second server 520-a having the smallest RTT among a plurality of second servers 520-a and 520-b as the second server to be accessed.

According to various embodiments, when IP addresses of the third servers 530-a and 530-b are included in access address information of the third servers 530-a and 530-b received from the second server 520-a, the EEC 503 may select the third server 530-a closest to the electronic device 400 on the basis of the IP addresses. According to an embodiment, the EEC 503 may compare IP subnet prefixes generated on the basis of the IP addresses of the third servers 530-a and 530-b with an IP subnet prefix of the electronic device 400 and select the third server 530-a having the IP subnet prefix which is the same as the IP subnet prefix of the electronic device 400 as the second server to be accessed.

According to various embodiments of the disclosure, in operation 607, the EEC 503 may transmit an edge service discovery request message making a request for access information of the third server 530-a to the second server 520-a on the basis of the access information of the second server 520-a.

According to various embodiments of the disclosure, in operation 609, the second server 520-a may transmit an edge service discovery response message including access information of at least one third server 530-a connected to the second server 520-a to the EEC 503 in response to reception of the edge service discover request message.

According to various embodiments of the disclosure, the EEC 503 may temporarily or non-temporarily store the access information of at least one third server 530-a included in the edge service discovery response message in a memory (not shown).

According to various embodiments of the disclosure, in operation 611, the EEC 503 may receive a connection request for the service using the third servers 530-a and 530-b from an application (for example, the application 505 of FIG. 5).

According to various embodiments of the disclosure, the service used by the third servers 530-a and 530-b may be an edge computing service using the edge network system 500. The application 505 may be an application which can use the edge computing service. The EEC 503 may select the third server 530-a to be accessed on the basis of comparison between identification information of the application 505 and an identifier (ACID) of the application of the third server 530-a included in the access information of the third server 530-a.

According to various embodiments of the disclosure, in operation 613, the EEC 503 may configure the connection between the application 505 and the selected third server 530-a.

According to various embodiments, a method by which the EEC 503 configures the application 505 to make the connection with the third server 530-a may include a method of transferring access information of the third server 530-a to the application 505 and configuring the application 506 to communication with the application installed in the third server 530-a. For example, the EEC 503 may transmit a response message including access address information of the server application (for example, IP addresses of the server applications 531 and 533) to the application 505 in response to a domain name system (DNS) query (question) request from the client application 505. The application 505 may configure communication with the application of the third server 530-*a* on the basis of access information of the server application.

According to various embodiments of the disclosure, the electronic device 400 (or the processor 501) may configure a dedicated network channel for the connection between the application 505 and the third server 530-*a*. For example, the processor 501 may control a communication circuit (for example, the wireless communication module 192 of FIG. 1) to generate a first channel which is a predetermined network interface (for example, to establish a PDU session dedicated for the application 505 or to access a dedicated DNN gateway). The electronic device 400 (or the processor 501) may control the wireless communication module 192 such that the applications 505 transmit or receive data through the predetermined network interface.

According to various embodiments of the disclosure, in operation 615, the application 505 may perform the service using the third server 530-*a* by transmitting or receiving application data to or from the connected third server 530-*a* in operation 617.

According to various embodiments of the disclosure, the second servers 520-*a* and 520-*b* may be connected to another second server (not shown). The other second server may be a global EES which manages the second servers 520-*a* and 520-*b*. The second servers 520-*a* and 520-*b* may be a local EES. In this case, the electronic device 400 may receive access information of another second server through a provisioning procedure. The electronic device 400 may receive access information of the second server 520-*a* or 520-*b* from another second server through an edge service discovery procedure.

Through the above scheme, the EEC 503 may access to the second server close to the electronic device 400 without transmitting the location of the electronic device 400 to an external server.

Figure 7:
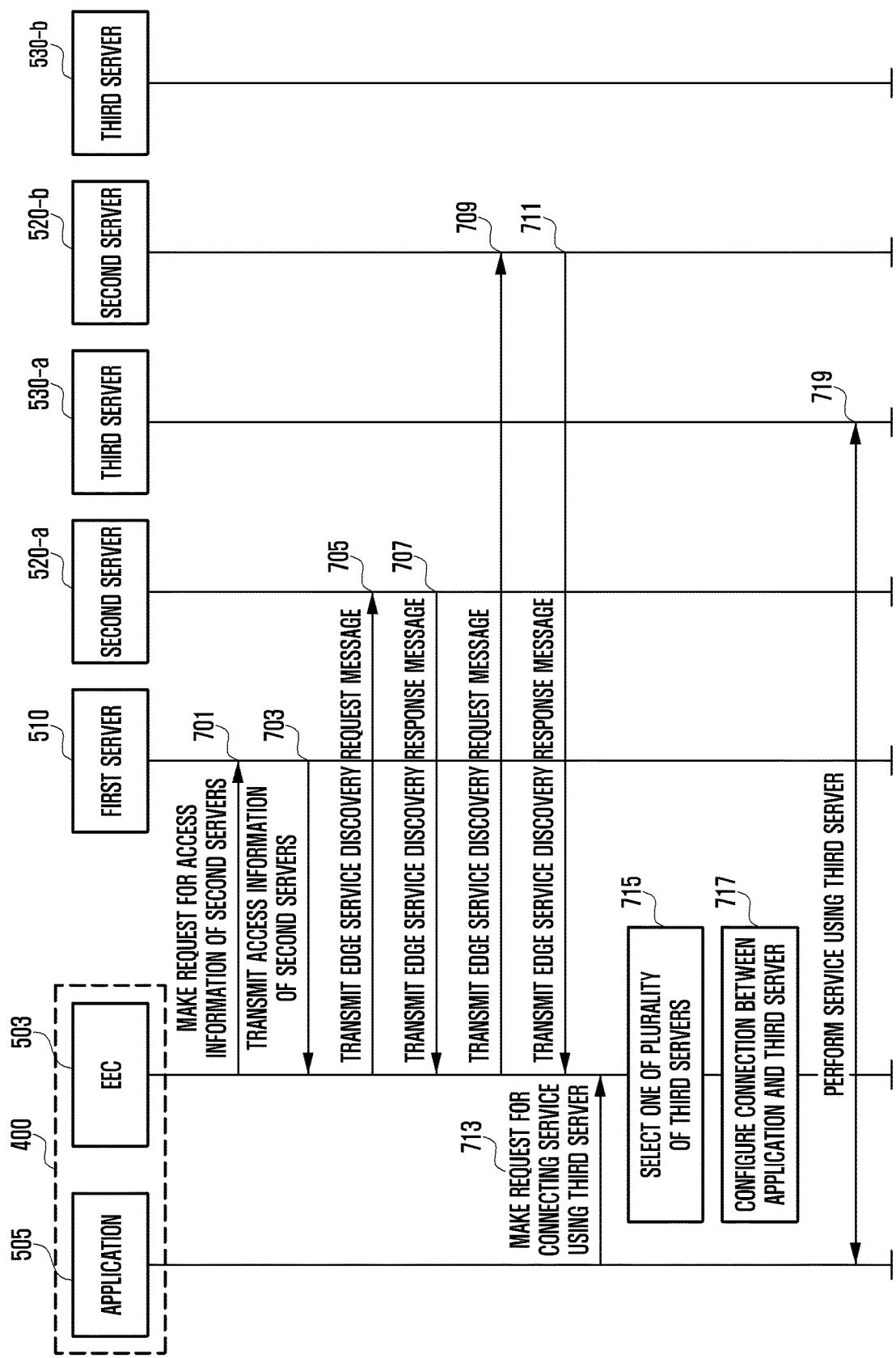
FIG. 7 illustrates an operation in which the electronic device selects one third server from among a plurality of third servers according to an embodiment of the disclosure.

FIG. 7 illustrates an operation in which the electronic device selects one third server from among a plurality of third servers according to an embodiment of the disclosure.

According to various embodiments of the disclosure, the third server 530-*a* or 530-*b* which can be accessed on the basis of access information of the third server 530-*a* or 530-*b* provided by the plurality of second servers 520-*a* or 520-*b* may be a server which can provide services (for example, services using the same application) which are partially the same as each other.

Referring to FIG. 7, in operation 701, an EEC (for example, the edge enabler client 503 of FIG. 5) of an electronic device (for example, the electronic device 400 of FIG. 4A) may transmit a signal making a request for access information of second server 520-*a* or 520-*b* (for example, the second server 520 of FIG. 5) to a first server (for example, the first server 510 of FIG. 5).

According to various embodiments of the disclosure, in operation 703, the first server 510 may transmit access information of a plurality of second servers 520-*a* and 520-*b* connected to the first server 510 in response to reception of an access information request for the second server 520-*a* or 520-*b*.

According to various embodiments of the disclosure, access information of the second server 520-*a* or 520-*b* may include at least one of an identifier of each of the plurality of second servers 520-*a* or 520-*b*, access address information of the plurality of second servers 520-*a* or 520-*b* (for example, IP address information of the second server 520-*a* or 520-*b*, domain information of the second server 520-*a* or 520-*b*, or URI information of the second server 520-*a* or 520-*b*).

According to various embodiments of the disclosure, in operation 705, the EEC 503 may transmit an edge service discovery request message making a request for access information of the third server 530-*a* to the second server 520-*a* on the basis of the access information of the second server 520-*a*.

According to various embodiments of the disclosure, in operation 707, the second server 520-*a* may transmit an edge service discovery response message including access information of at least one third server 530-*a* connected to the second server 520-*a* to the EEC 503 in response to reception of the edge service discover request message.

According to various embodiments of the disclosure, access information of the third server 530-*a* may include an identifier (EASID) of the third server 530-*a*, identification information (ACID) of the application 505 installed in the electronic device 400, and/or (edge service) access address information of the third server 530-*b* (for example, at least one of a URI of the third server 530-*b* for edge service access, a domain name (fully qualified domain name (FQDN)) of the third server 530-*a*, and an IP address of the third server 530-*a*).

According to various embodiments of the disclosure, the access information of the third server 530-*a* may include information related to the location of the third server 530-*a*.

The information related to the location of the third server 530-*a* may include location information of the third server 530-*a*. According to an embodiment, the location information of the third server 530-*a* may include latitude and longitude of the third server 530-*a*. According to an embodiment, the location information of the third server 530-*a* may include a mobile country code indicating a country in which the third server 530-*a* or 530-*b* is located or a mobile network code indicating an operator of the third server 530-*a*.

The information related to the location of the third server 530-*a* may include an identifier which can indicate the location of the third server 530-*a*. According to an embodiment, the identifier which can indicate the location of the third server 530-*a* may be an identifier (cell id) of a BS (for example, the BS 410-*a* of FIG. 4B) connected to the third server 530-*a* or a BS (for example, the BS 410-*b* of FIG. 4B) adjacent to the third server 530-*a*, or a tracking area identification (TAI) of the third server 530-*a*.

The information related to the location of the third server 530-*a* may include a service radius of the third server 530-*a*.

According to various embodiments of the disclosure, in operation 709, the EEC 503 may transmit an edge service discovery request message making a request for access information of the third server 530-*a* to the second server 520-*b* on the basis of the access information of the second server 520-*b*.

According to various embodiments of the disclosure, in operation 711, the second server 520-*b* may transmit an edge service discovery response message including access information of at least one third server 530-*b* connected to the second server 520-*b* to the EEC 503 in response to reception of the edge service discovery request message.

According to various embodiments of the disclosure, there is no limitation in the order of operation 705 and operation 709. Operation 709 may be performed earlier than operation 705, and operation 705 and operation 709 may be performed at the same time for at least a time period.

According to various embodiments, access information of the third server 530-*b* may include an identifier (EASID) of the third server 530-*b*, identification information (ACID) of the application 505 installed in the electronic device 400 and/or (edge service) access address information of the third server 530-*b* (for example, at least one of a URI of the third server 530-*b* for edge service access, a domain name (FQDN) of the third server 530-*b*, and an IP address of the third server 530-*b*).

According to various embodiments of the disclosure, the access information of the third server 530-*b* may include information related to the location of the third server 530-*b*.

The information related to the location of the third server 530-*b* may include location information of the third server 530-*b*. According to an embodiment, the location information of the third server 530-*b* may include latitude and longitude of the third server 530-*b*. According to an embodiment, the location information of the third server 530-*a* may include a mobile country code indicating a country in which the third server 530-*a* or 530-*b* is located or a mobile network code indicating an operator of the third server 530-*b*.

The information related to the location of the third server 530-*b* may include an identifier which can indicate the location of the third server 530-*b*. According to an embodiment, the identifier which can indicate the location of the third server 530-*b* may be an identifier (cell id) of a BS (for example, the BS 410-*a* of FIG. 4B) connected to the third server 530-*b* or a BS adjacent to the third server 530-*b*, or a tracking area identification (TAI) of the third server 530-*b*.

The information related to the location of the third server 530-*b* may include a service radius of the third server 530-*b*.

According to various embodiments of the disclosure, in operation 713, the EEC 503 may receive a connection request for the service using the third server 530-*a* or 530-*b* from an application (for example, the application 505 of FIG. 5).

According to various embodiments of the disclosure, the service used by the third server 530-*a* or 530-*b* may be an edge computing service using the edge network system 500. The application 505 may be an application which can use the edge computing service.

According to various embodiments of the disclosure, in operation 715, the EEC 503 may select the third server to be accessed to use the edge computing service from among the plurality of third servers 530-*a* and 530-*b*.

According to various embodiments of the disclosure, the EEC 503 may select the third server 530-*a* or 530-*b* to be accessed on the basis of comparison between identification information of the application 505 and the identifier (ACID) of the application of the third server 530-*a* or 530-*b* included in the access information of the third server 530-*a*.

According to various embodiments of the disclosure, the third server 530-*a* or 530-*b* may be a server which can provide the same service (for example, a service using the same application) which can be used by the application 505. For example, when the identifier (ACID) of the application of the third server 530-*a* or 530-*b* included in the access information of the third server is the same as the identification information of the application 506, all of the third servers 530-*a* and 530-*b* may be servers which can provide the service available by the application 505.

The EEC 503 may select the third server 530-*a* or 530-*b* to be accessed on the basis of information related to the location of the third server 530-*a* or 530-*b* in response to identification that the identifier (ACID) of the application of the third server 530-*a* or 530-*b* included in the access information of the third server is the same as the identification information of the application 505.

According to various embodiments of the disclosure, the EEC 503 may compare the location information of the electronic device 400 with the location information of the third server 530-*a* or 530-*b* in response to the location information of the third server 530-*a* or 530-*b* included in the information related to the locations of the third server 530-*a* or 530-*b* and may select the third server 530-*a* closest to the electronic device 400 as the third server to be accessed. When the service radiuses of the third server 530-*a* or 530-*b* is included in the location information of the third server 530-*a* or 530-*b*, the EEC 503 may select the third server 530-*a* included in the service radius of the third server 530-*a* or 530-*b* as the third server to be accessed by the electronic device 400.

According to various embodiments of the disclosure, the EEC 503 may compare an identifier of the BS 410-*a* connected to the electronic device 400 or the BS 410-*b* adjacent to the electronic device 400 with the identifier of the BS 410-*a* or 410-*b* connected or adjacent to the third server 530-*a* or 530-*b* in response to the identifiers indicating the locations of the third server 530-*a* or 530-*b* included in the information related to the locations of the third server 530-*a* or 530-*b*. In response to identification that the identifiers match, the EEC 503 may select the third server 530-*a* corresponding to the matching identifier as the third server to be accessed.

According to various embodiments of the disclosure, the EEC 503 may compare the TAI of the electronic device 400 with the TAIs of the third server 530-*a* or 530-*b* in response to the identifier indicating the locations of the third server 530-*a* or 530-*b* included in the information related to the locations of the third server 530-*a* or 530-*b*. In response to identification that the TAIs match, the EEC 503 may select the third server 530-*a* corresponding to the matching TAI as the third server to be accessed.

According to various embodiments of the disclosure, the EEC 503 may compare a MCC or (MNC) of the electronic device 400 with a MCC (or MNC) of the third server 530-*a* or 530-*b* in response to the identifier indicating the country in which the third server 530-*a* or 530-*b* is located or the operator thereof included in the information related to the location of the third server 530-*a* or 530-*b*. The EEC 503 may select the third server 530-*a* having the matching MCC (or MNC) as the third server to be accessed.

According to various embodiments of the disclosure, the EEC 503 may make the connection with the third server 530-*a* or 530-*b* on the basis of access address information of the third server 530-*a* or 530-*b* received from the first server 510 and measure a round trip time (RTT) between each of the third server 530-*a* or 530-*b* and the electronic device 400. According to an embodiment, the EEC 503 may transmit a test signal (for example, a ping signal) to the third server 530-*a* or 530-*b* and measure the RTT on the basis of a time at which a response signal corresponding to the test signal is received. The EEC 503 may select the third server 530-*a* having the smallest RTT among a plurality of third servers 530-*a* and 530-*b* as the second server to be accessed.

According to various embodiments, when the IP address of the third server 530-*a* or 530-*b* is included in access address information of the third server 530-*a* or 530-*b* received from the second server 520-*a*, the EEC 503 may select the third server 530-*a* closest to the electronic device 400 on the basis of the IP addresses. According to an embodiment, the EEC 503 may compare IP subnet prefixes generated on the basis of the IP address of the third server 530-*a* or 530-*b* with an IP subnet prefix of the electronic device 400 and select the third server 530-*a* having the IP subnet prefix which is the same as the IP subnet prefix of the electronic device 400 as the second server to be accessed.

According to various embodiments of the disclosure, when the information related to the location of the third server 530-*a* or 530-*b* is not included in the access information of the third server 530-*a* or 530-*b*, the EEC 503 may select the third server to be accessed from among the third servers 530-*a* and 530-*b* on the basis of the information related to the location of the second server 520-*a* or 520-*b*. In consideration of the existence of the third server 530-*a* or 530-*b* physically close to the second server 520-*a* or 520-*b*, the EEC 503 may select the third server 530-*a* or 530-*b* to be accessed on the basis of information related to the location of the second server 520-*a* or 520-*b* that is not the information related to the location of the third server 530-*a* or 530-*b*.

According to various embodiments of the disclosure, the access information of the third server 530-*a* received in operation 709 and the access information of the third server 530-*b* received in operation 711 may be at least partially the same (for example, FQDN) as each other. In this case, the EEC 503 may determine the third server 530-*a* corresponding to the second server (for example, the second server 520-*a*) closest to the electronic device 400 among the second servers 520-*a* and 520-*b* as the third server to be accessed. The EEC 503 may determine the second server closest to the electronic device 400 through an RTT measurement process with the second server 520-*a* or 520-*b*.

According to various embodiments of the disclosure, in operation 717, the EEC 503 may configure the connection between the application 505 and the selected third server 530-*a*.

According to various embodiments, a method by which the EEC 503 configures the application 505 to make the connection with the third server 530-*a* may include a method of transferring access information of the third server 530-*a* to the application 505 and configuring the application 506 to communication with the application installed in the third server 530-*a*. For example, the EEC 503 may transmit a response message including access address information of the server application (for example, IP addresses of the server applications 531 and 533) to the application 505 in response to a domain name system (DNS) query (question) request from the client application 505. The application 505 may configure communication with the application of the third server 530-*a* on the basis of access information of the server application.

According to various embodiments of the disclosure, the electronic device 400 (or the processor 501) may configure a dedicated network channel for the connection between the application 505 and the third server 530-*a*. For example, the processor 501 may control a communication circuit (for example, the wireless communication module 192 of FIG. 1) to generate a first channel which is a predetermined network interface (for example, to establish a PDU session dedicated for the application 505 or to access a dedicated DNN gateway). The electronic device 400 (or the processor 501) may control the wireless communication module 192 such that the applications 505 transmit or receive data through the predetermined network interface.

According to various embodiments of the disclosure, in operation 719, the application 505 may perform the service using the third server 530-*a* by transmitting or receiving application data to or from the connected third server 530-*a* in operation 617.

Through the above scheme, the EEC 503 may access to the third server closest to the electronic device 400 without transmitting the location of the electronic device 400 to the outside.

Figure 8:
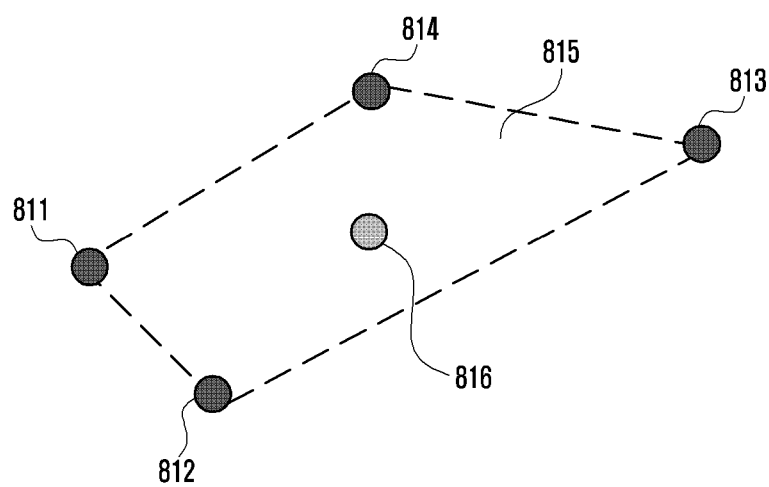
FIG. 8 illustrates an embodiment in which the electronic device selects the second server and/or the third server according to an embodiment of the disclosure.

FIG. 8 illustrates an embodiment in which the electronic device selects the second server and/or the third server according to an embodiment of the disclosure.

According to various embodiments of the disclosure, an EEC (for example, the EEC 503 of FIG. 5) may store a connection history between a second server (for example, the second servers 520 of FIG. 4A) and/or a third server (for example, the third servers 530 of FIG. 4A) in a memory (for example, the memory 130 of FIG. 1).

According to an embodiment, the EEC 503 may store history data in which information on the connected second server 520 and/or third server 530 and the location of the electronic device 400 are mapped in the memory 130. For example, the mapping data may be stored in the form of Table 5.

TABLE 5

| Location of electronic device | Identifier of connected second server 520-a | Access address information of connected second server 520-a | Identification information of non-connected second server 520-b | Access address information of non-connected second server 520-b |
|---|---|---|---|---|
| Location a | EES 1 | ees1.edge.com | EES2 | ees2.edge.com |
| Location b | EES 1 | ees1.edge.com | EES2 | ees2.edge.com |
| Location c | EES 1 | ees1.edge.com | EES2 | ees2.edge.com |
| Location d | EES 1 | ees1.edge.com | EES2 | ees2.edge.com |

Referring to FIG. 5, history data may include at least one of an identifier of the connected second server 520-*a*, access address information of the connected second server 520-*a*, an identifier of the non-connected second server 520-*b*, and access address information of the non-connected second server 520-*b*. Although not stated in Table 5, the history data may also include other information on the second server 520-*a* or 520-*b* (for example, RTT information of the second server 520-*a* or 520-*b* and valid time of information on the second server 520-*a* or 520-*b*). Table 5 is made on the basis of the second server 520-*a* or 520-*b*, but the history data may include identifiers of the third servers 530-*a* and 530-*b* and access address information of the third servers 530-*a* and 530-*b*.

According to various embodiments of the disclosure, the EEC 503 may determine the second server or third server to be accessed on the basis of information related to the location of the electronic device 400 and the history data.

According to various embodiments of the disclosure, the EEC 503 may search for an identifier (EES1) of the second server 520-*a* corresponding to the location (for example, location A) of the electronic device 400 on the basis of the history data. The EEC 503 may receive access information of the second server 520-*a* or 520-*b* from the first server 510 through a provisioning procedure and identify the identifier of the second server 520-*a* or 520-*b* included in access information of the second server 520. In response to identification of the identifier (EES1) that matches the identifier (EES1) found in the identified identifiers (EES1 and EES2), the EEC 503 may perform a discovery procedure with the second server 520-*a* corresponding to the matching identifier (EES1) without any operation of identifying the second server 520-*a* or 520-*b* closest to the electronic device 400.

According to various embodiments of the disclosure, when the electronic device 400 exists at a location that is not included in the history data, the EEC 503 may select the second server to be accessed on the basis of the history data.

Referring to FIG. 8, the EEC 503 may identify locations 811, 812, 813, and 814 of the electronic device 400 having the connection history with the second server 520-*a* on the basis of the history data. The EEC 503 may identify whether the electronic device 400 is located at the inside 815 of a line that virtually connects the locations 811, 812, 813, and 814 of the electronic device 400 having the connection history with the second server 520-*a*. In response to identification that a location 816 of the electronic device 400 corresponds to the inside 815 of the line that virtually connects the locations 811, 812, 813, and 814 of the electronic device 400 having the connection history with the second server 520-*a*, the EEC 503 may perform a discovery procedure with the second server 520-*a* having the connection history without any operation of identifying the second server 520-*a* or 520-*b* closest to the electronic device 400.

Through the above scheme, the EEC 503 may access the second server or third server closest to the electronic device 400 without transmitting the location of the electronic device 400 to the outside.

FIGS. 9A, 9B, 9C, 9D, 9E, 9F, and 9G illustrate an embodiment in which the electronic device selects a second server and/or a third server on the basis of movement of the electronic device according to various embodiments of the disclosure.

According to various embodiments, an electronic device (for example, the electronic device 400 of FIG. 4A) (or an EEC (for example, the EEC 503 of FIG. 5) may determine whether to change a connected second server 520-*a* or 520-*b* (or a third server 530-*a* or 520-*b*) in response to detection of movement of the electronic device 400.

According to an embodiment, in response to detection of movement of the electronic device 400 by a predetermined distance or longer, the electronic device 400 may identify the second server 520-*a* or 520-*b* (or the third server 530-*a* or 530-*b*) closest to the electronic device 400 and change the second server (or the third server) to be accessed in response to identification that the closest second server closest (or the closest third server) is changed. However, repeating the operation of identifying the closest server according to movement of the electronic device 400 by the electronic device 400 may increase power consumption of the electronic device 400. Hereinafter, an embodiment in which the electronic device 400 does not search for the second server 520-*a* or 520-*b* (or the third server 530-*a* or 530-*b*) closest to the electronic device 400 in consideration of a movement direction of the electronic device 400 is described.

Figure 9A:
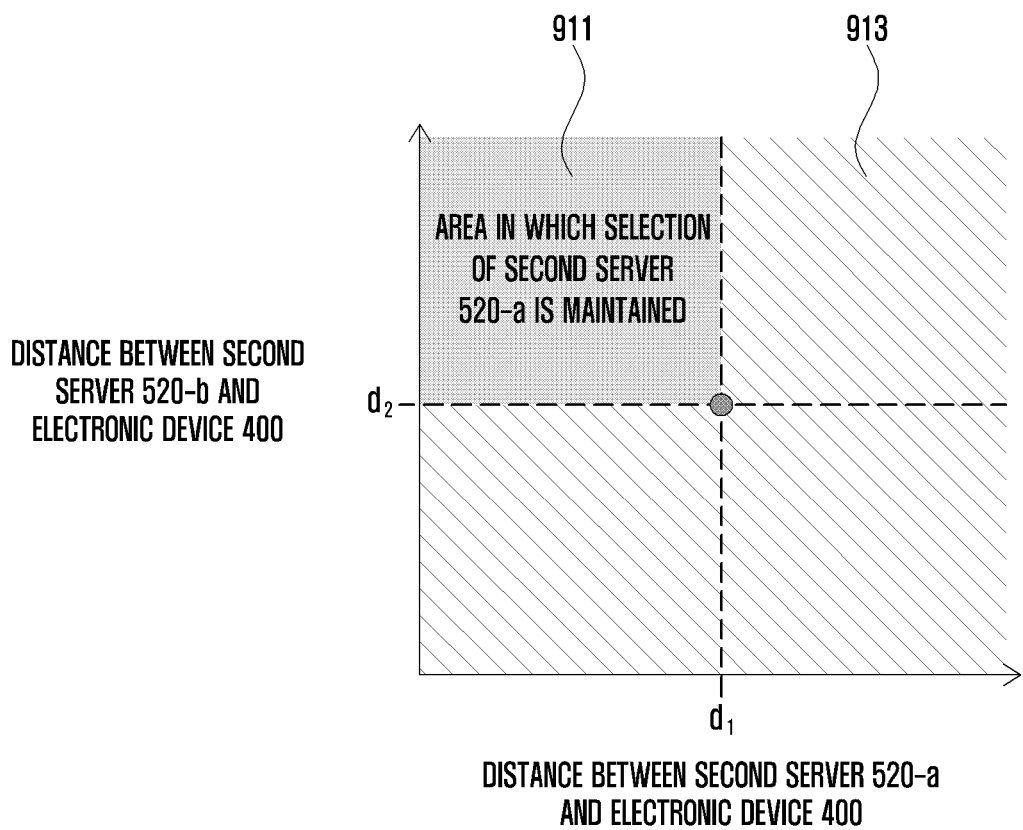
FIGS. 9A, 9B, 9C, 9D, 9E, 9F, and 9G illustrate various embodiments in which the electronic device selects the second server and/or the third server on the basis of movement of the electronic device according to various embodiments of the disclosure.

Referring to FIG. 9A, an embodiment of determining whether to change the connected second server according to movement of the electronic device 400 in the state in which the electronic device 400 is connected to the second server 520-*a* is illustrated.

According to various embodiments of the disclosure, the electronic device 400 may identify a movement direction of the electronic device 400 in response to detection of movement of the electronic device 400.

The electronic device 400 may maintain the connection between the connected second server 520-*a* and the electronic device 400 in response to identification that the distance between the second server 520-*a* and the electronic device 400 decreases and the distance between the second server 520-*b* and the electronic device 400 increases as indicated by reference numeral 911.

In response to identification that the distance between the second server 520-*a* and the electronic device 400 increases or the distance between the second server 520-*a* and the electronic device 400 and the distance between the second server 520-*b* and the electronic device 400 decrease as indicated by reference numeral 913, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

Figure 9B:
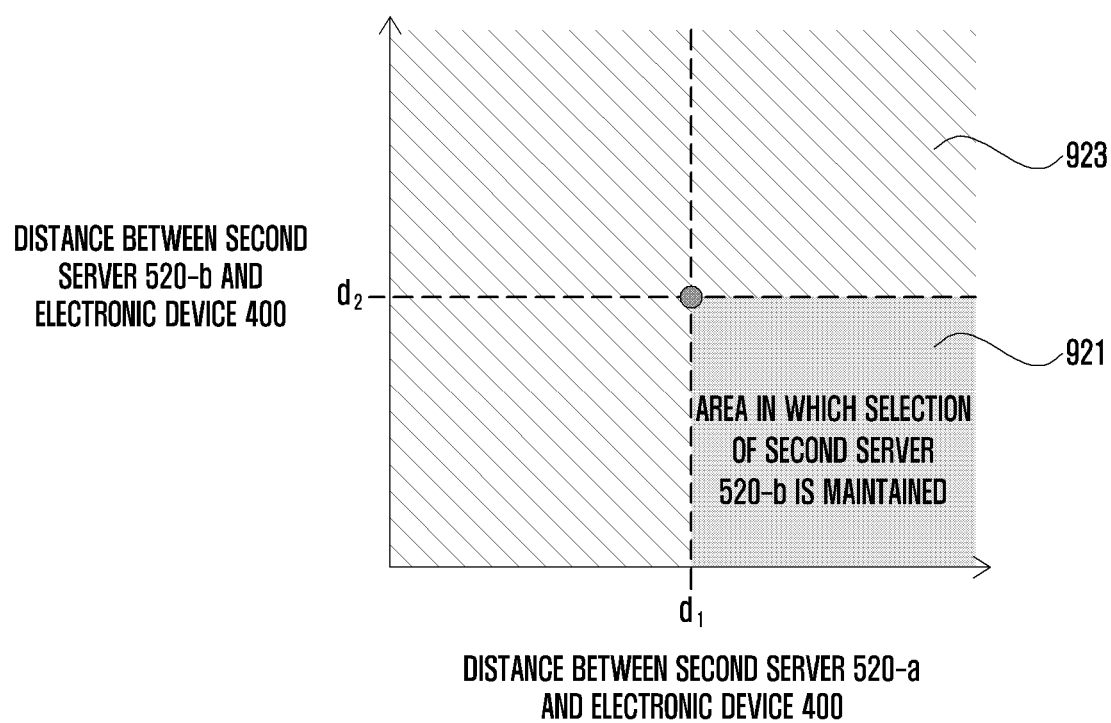

Referring to FIG. 9B, an embodiment of determining whether to change the connected second server according to movement of the electronic device 400 in the state in which the electronic device 400 is connected to the second server 520-*b*.

According to various embodiments of the disclosure, the electronic device 400 may identify a movement direction of the electronic device 400 in response to detection of movement of the electronic device 400.

In response to identification that the distance between the second server 520-*b* and the electronic device 400 decreases and the distance between the second server 520-*a* and the electronic device 400 increases as indicated by reference numeral 921, the electronic device 400 may maintain the connection between the connected second server 520-*b* and the electronic device 400.

In response to identification that the distance between the second server 520-*b* and the electronic device 400 increases or the distance between the second server 520-*b* and the electronic device 400 and the distance between the second server 520-*a* and the electronic device decrease as indicated by reference numeral 923, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

According to various embodiments of the disclosure, when the electronic device 400 has not received location information of the second server 520-*a* or 520-*b*, the electronic device 400 may identify the strength of a signal output (or broadcasted) by the adjacent BS 410-*a* or 410-*b* on the basis of an identifier of the BS connected or adjacent to the second server 520-*a* or 520-*b*.

Figure 9C:
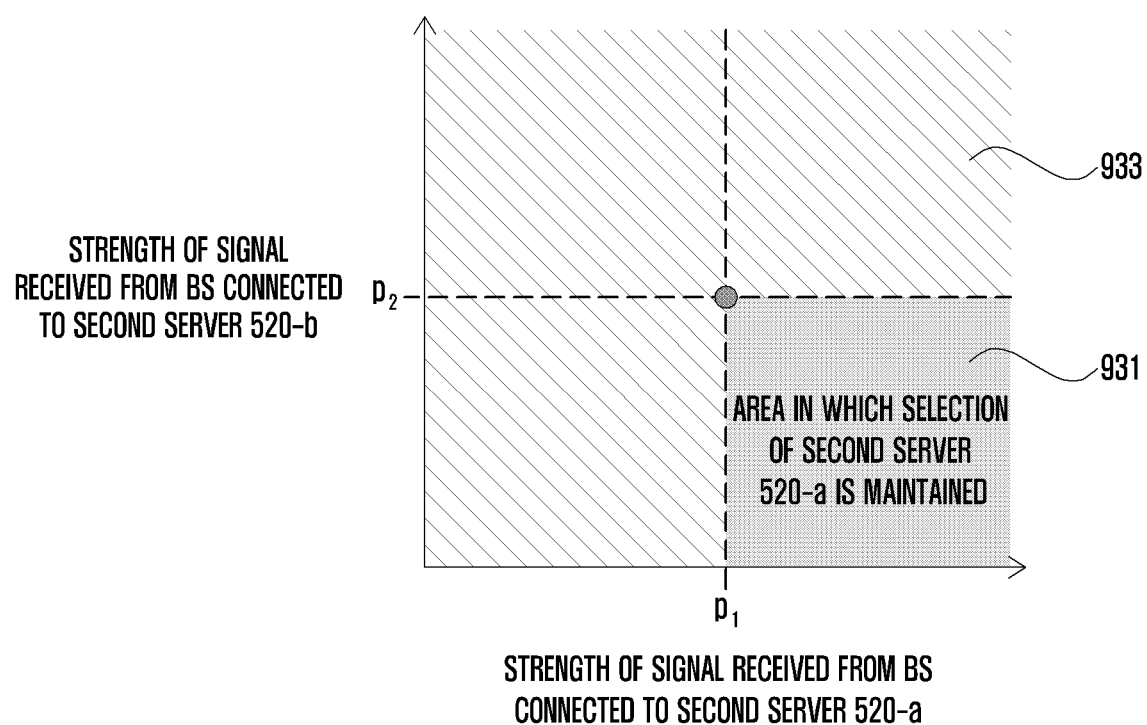

Referring to FIG. 9C, an embodiment of determining whether to change the connected second server according to movement of the electronic device 400 in the state in which the electronic device 400 is connected to the second server 520-*a* is illustrated.

According to various embodiments of the disclosure, in response to detection of movement of the electronic device 400, the electronic device 400 may identify the strength of the signal output by the BS connected or adjacent to the second server 520-*a* or 520-*b*.

In response to the strength of the signal output by the BS connected or adjacent to the second server 520-*a* increases and the strength of the signal output by the BS connected or adjacent to the second server 520-*b* decreases as indicated by reference numeral 931, the electronic device 400 may maintain the connection between the connected second server 520-*a* and the electronic device 400.

In response to identification that the strength of the signal output by the BS connected or adjacent to the second server 520-*a* decreases or the strength of the signal output by the BS connected or adjacent to the second server 520-*a* and the strength of the signal output by the BS connected or adjacent to the second server 520-*b* increase as indicated by reference numeral 933, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

According to various embodiments of the disclosure, when the electronic device 400 is connected to the BS adjacent to the second server 520-*b* in the state in which the electronic device 400 is connected to the BS adjacent to the second server 520-*b*, the electronic device 400 may release the connection with the second server 520-*a* and make the connection with the second server 520-*b*.

Figure 9D:
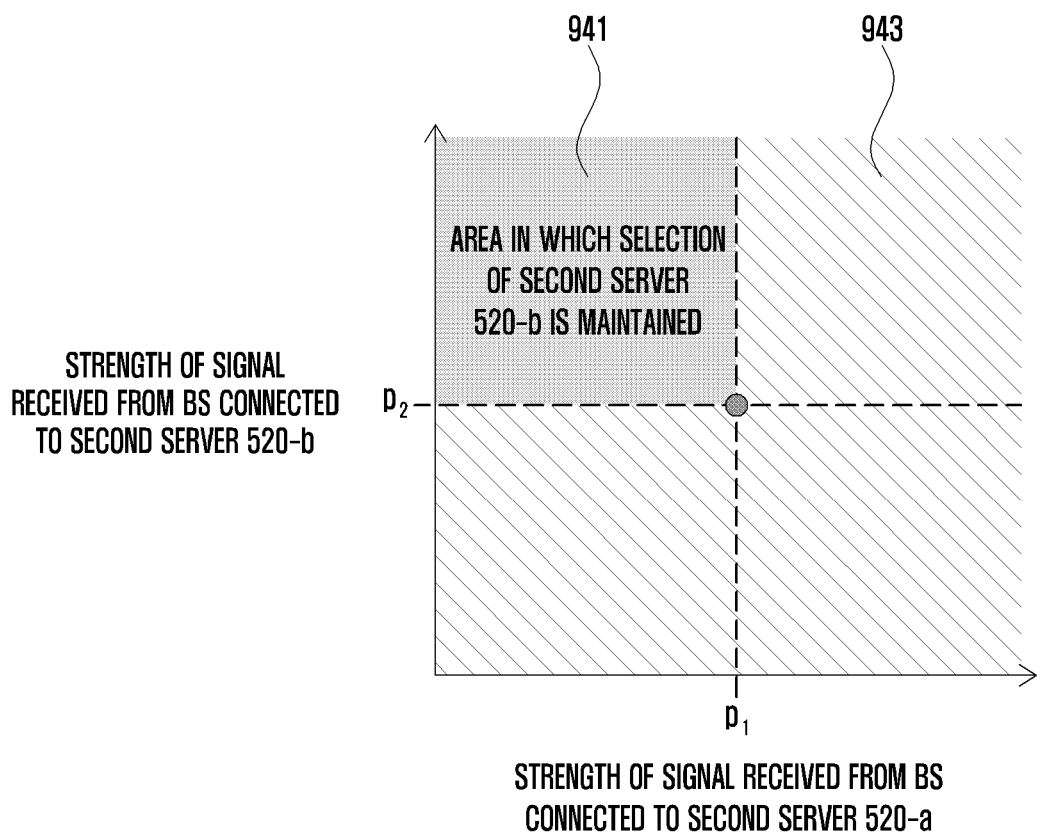

Referring to FIG. 9D, an embodiment of determining whether to change the connected second server according to movement of the electronic device 400 in the state in which the electronic device 400 is connected to the second server 520-*b* is illustrated.

According to various embodiments of the disclosure, in response to detection of movement of the electronic device 400, the electronic device 400 may identify the strength of the signal output of the BS connected or adjacent to the second server 520-*a* or 520-*b*.

In response to identification that the strength of the signal output by the BS connected or adjacent to the second server 520-*b* increases and the strength of the signal output by the BS connected to adjacent to the second server 520-*a* decreases as indicated by reference numeral 941, the electronic device 400 may maintain the connection between the connected second server 520-*b* and the electronic device 400.

In response to identification that the strength of the signal output by the BS connected or adjacent to the second server 520-*b* decreases or the strength of the signal output by the BS connected or adjacent to the second server 520-*b* and the strength of the signal output by the BS connected or adjacent to the second server 520-*a* increase as indicated by reference numeral 943, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

According to various embodiments of the disclosure, the first server 510 may provide the electronic device 400 with location information (for example, latitude and longitude information) of one second server 520-*a* among the second servers 520-*a* and 520-*b*, but may provide the electronic device 400 with identification information related to the location (for example, identification information of the BS connected to adjacent to the second server 520-*b*) rather than location information of the other second server 520-*b*. In this case, in response to detection of movement of the electronic device 400, the electronic device 400 may identify the strength of the signal output (or broadcasted) by the adjacent BS 410-*b* on the basis of a movement direction of the electronic device 400 and/or the identifier of the BS connected or adjacent to the second server 520-*b*.

Figure 9E:
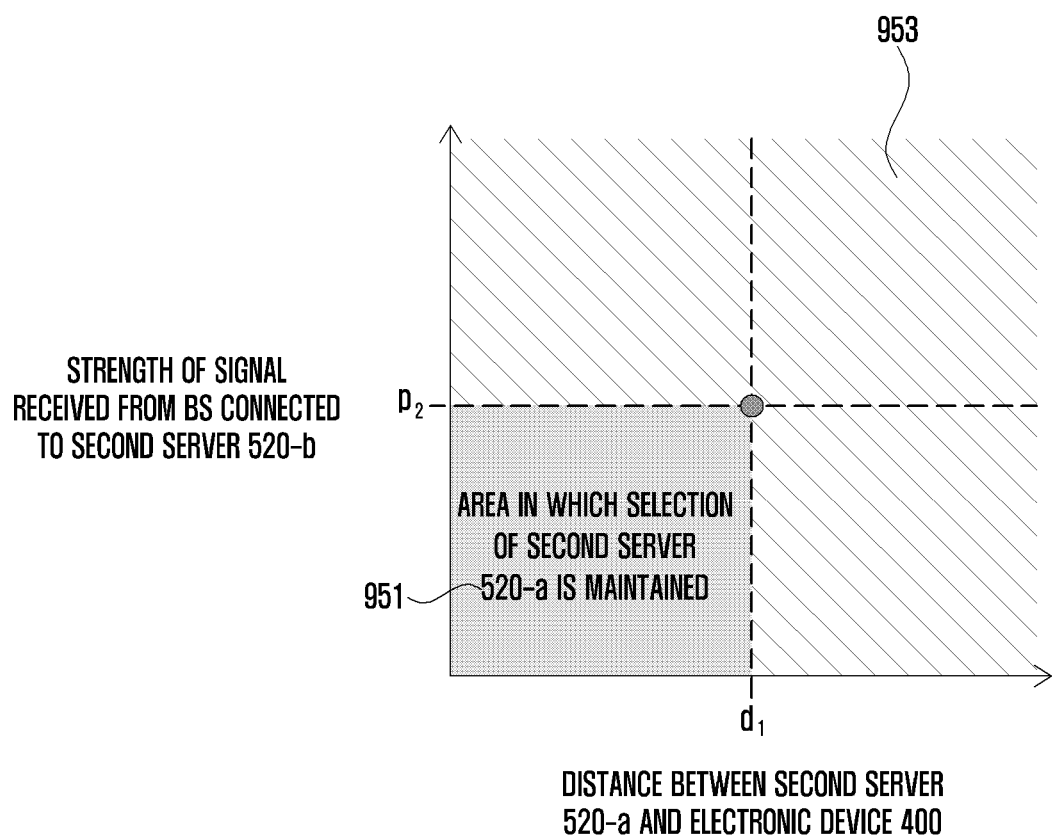

Referring to FIG. 9E, an embodiment of determining whether to change the connected second server according to movement of the electronic device 400 in the state in which the electronic device 400 is connected to the second server 520-*a* is illustrated.

According to various embodiments of the disclosure, in response to detection of movement of the electronic device 400, the electronic device 400 may identify the movement direction of the electronic device 400 and the strength of the signal output by the BS connected or adjacent to the second server 520-*b*.

In response to identification that the distance between the second server 520-*a* and the electronic device 400 decreases and the strength of the signal output by the BS connected or adjacent to the second server 520-*b* decreases as indicated by reference 951, the electronic device 400 may maintain the connection between the connected second server 520-*a* and the electronic device 400.

In response to identification that the distance between the second server 520-*a* and the electronic device 400 increases or the distance between the second server 520-*a* and the electronic device 400 decreases and all signals output by the BS connected or adjacent to the second BS 520-*b* increase as indicated by reference numeral 953, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

Figure 9F:
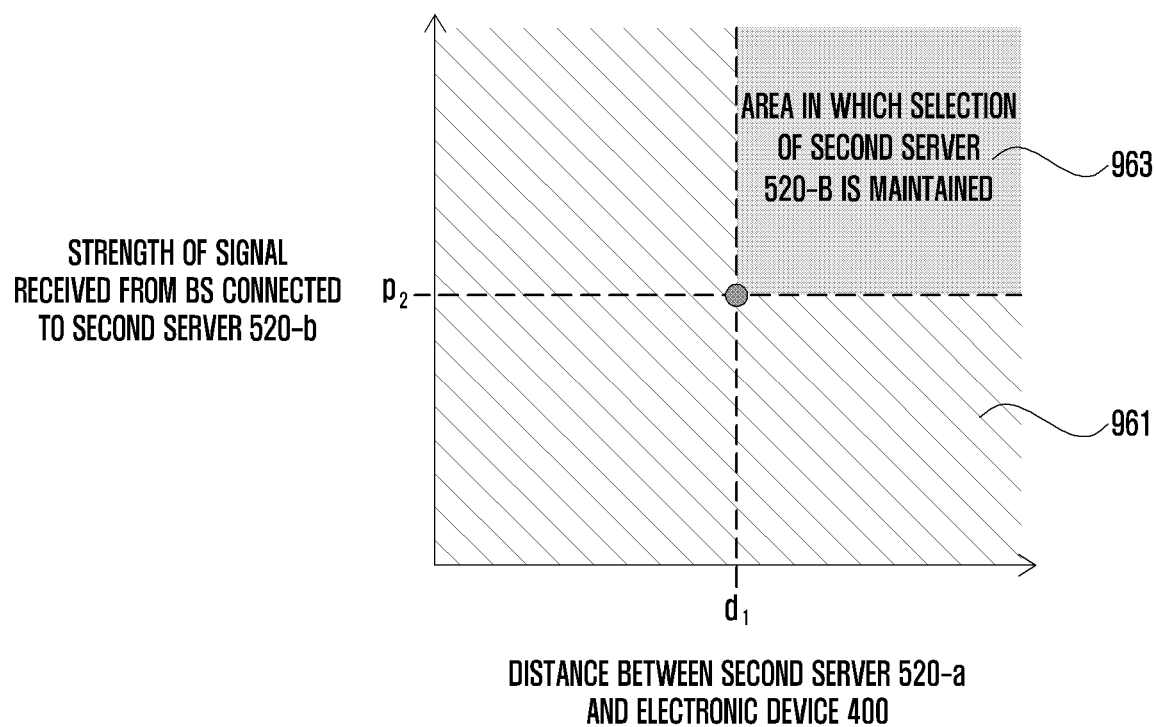

Referring to FIG. 9F, an embodiment of determining whether to change the connected second server according to movement of the electronic device 400 in the state in which the electronic device 400 is connected to the second server 520-*b* is illustrated.

According to various embodiments of the disclosure, in response to detection of movement of the electronic device 400, the electronic device 400 may identify the strength of the signal output of the BS connected or adjacent to the second server 520-*a* or 520-*b*.

In response to identification that the strength of the signal output by the BS connected to adjacent to the second server 520-*b* and the distance between the second server 520-*a* and the electronic device 400 increases as indicated by reference numeral 961, the electronic device 400 may maintain the connection between the connected second server 520-*b* and the electronic device 400.

In response to identification that the strength of the signal output by the BS connected or adjacent to the second server 520-*b* decreases or the strength of the signal output by the BS connected or adjacent to the second server 520-*b* increases and the distance between the second server 520-*a* and the electronic device 400 decreases as indicated by reference numeral 963, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

According to various embodiments of the disclosure, in areas 913, 923, 933, 943, 953, and 963 other than areas 911, 921, 931, 941, 951, and 961 in which the connection with the conventionally connected second server 520-*a* or 520-*b* is maintained, the electronic device 400 may make the connection with the second server 520-*a* or 520-*b* on the basis of access address information of the second server 520-*a* or 520-*b* received from the first server 510 and measure a round trip time (RTT) of each of the second server 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The EEC 503 may select the second server having the shortest RTT among the plurality of second servers 520-*a* and 520-*b* as a second server to be accessed.

Figure 9G:
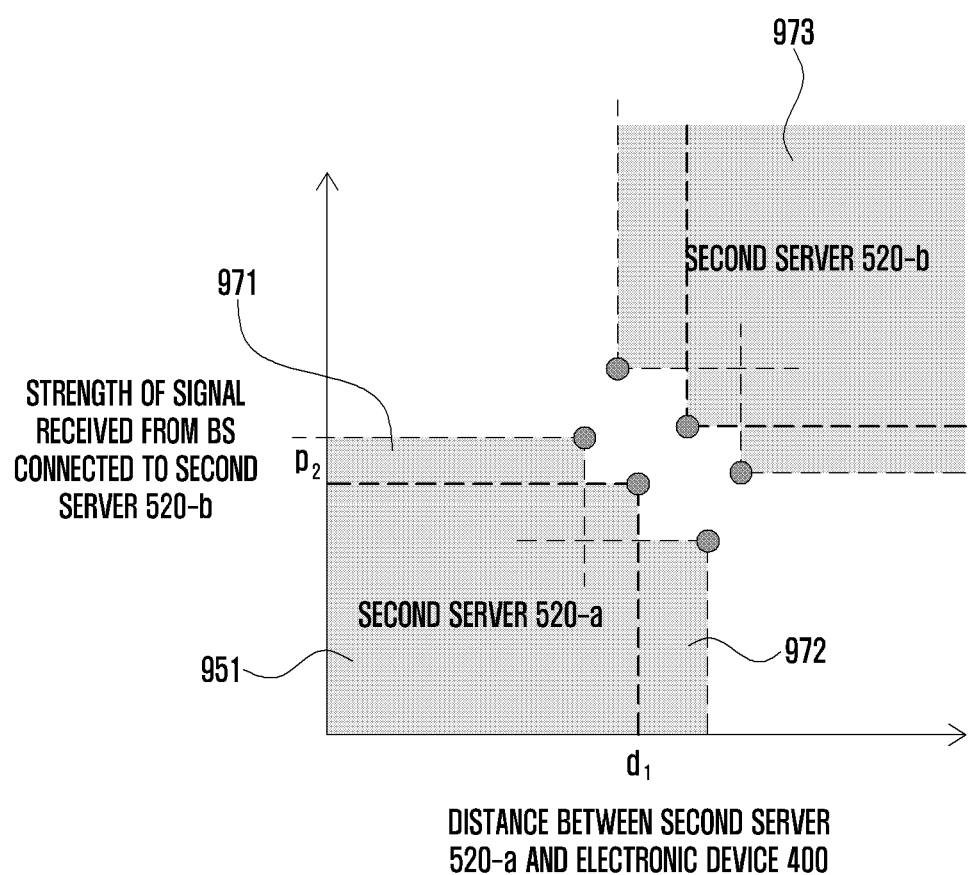

Referring to FIG. 9G, the electronic device 400 may determine the second server 520-*a* or 520-*b* to be connected in the areas 913, 923, 933, 943, 953, and 963 other than areas 911, 921, 931, 941, 951, and 961 in which the connection with the conventionally connected second server 520-*a* or 520-*b* is maintained on the basis of the measured RTT, and update history data obtained by mapping information on the connected second server 520-*a* or 520-*b* and the location of the electronic device 400. As illustrated in FIGS. 9A to 9G, the history data may include the relation between a value related to the distance between the second server 520-*a* and the electronic device 400 and a value related to the distance between the second server 520-*b* and the electronic device 400. The history data may be visualized in the form of a graph as illustrated in FIGS. 9A to 9G.

Referring to FIG. 9G, the electronic device 400 may determine the second server 520-*a* to be connected within some areas 971 and 972 among the areas 913, 923, 933, 943, 953, and 963 other than areas 911, 921, 931, 941, 951, and 961 in which the connection with the conventionally connected second server 520-*a* or 520-*b* is maintained and may update the history data. The electronic device 400 may determine the second server 520-*b* to be connected with other areas 973 and update the history data.

According to various embodiments of the disclosure, the electronic device 400 may determine the second server or third server to be accessed on the basis of information related to the location of the electronic device 400 and the history data.

According to various embodiments of the disclosure, the electronic device 400 may search for an identifier (EES1) of the second server 520-*a* corresponding to the location (for example, Location A) of the electronic device 400 on the basis of the history data. The electronic device 400 may receive access information of the second server 520-*a* or 520-*b* from the first server 510 through a provisioning procedure and identify the identifier of the second server 520-*a* or 520-*b* included in the access information of the second server 520. In response to identification of the identifier (EES1) that matches the identifier (EES1) found in the identified identifiers (EES1 and EES2), the electronic device 400 may perform a discovery procedure with the second server 520-*a* corresponding to the matching identifier (EES1) without any operation of identifying the second server 520-*a* or 520-*b* closest to the electronic device 400.

An electronic device according to various embodiments of the disclosure may include a memory configured to store an application and/or an edge enabler client (EEC), a communication circuit used for connections between the electronic device, and a first server, a plurality of second servers, and/or third servers existing outside the electronic device, through a base station (BS), and a processor, and the application may be configured to perform one or more services corresponding to an application, which can be executed in the third server, in the electronic device, and the processor may be configured to receive access information of the second servers for access to the second servers from the first server, select a second server to be accessed, based on information related to locations of the second servers and information related to a location of the electronic device in response to the information related to the locations of the second servers included in the access information of the second servers, and access the selected second server and perform the service.

In the electronic device according to various embodiments of the disclosure, the processor may be configured to select a second server closest to the electronic device from among the plurality of second servers, based on information related to locations of the second servers and information related to a location of the electronic device.

In the electronic device according to various embodiments of the disclosure, the processor may be configured to receive the access information of the plurality of second servers, perform a discovery operation with the third servers, based on the access information of the plurality of second servers, select a second server closest to the electronic device, based on information related to locations of the second servers in response to identification that a number of third servers supporting a service, which can be used by the application, is plural, and access a third server corresponding to the selected second server and perform the service.

In the electronic device according to various embodiments of the disclosure, the processor may be configured to receive access information of the third servers from the selected second server, select a third server to be accessed, based on information related to locations of the third servers and information related to a location of the electronic device in response to the information related to the locations of the third server included in access information of the third servers, and access the selected third server and perform the service.

In the electronic device according to various embodiments of the disclosure, the processor may be configured to receive the access information of the third servers from the selected second server, select a third server to be accessed, based on the information related to a location of the second server and the information related to the location of the electronic device, and access the selected third server and perform the service.

In the electronic device according to various embodiments of the disclosure, the information related to the locations of the second servers may include at least one of location information of the second servers, identification information of BSs adjacent to the second servers, tracking area identifications (TAIs) of the second servers, and IP addresses of the second servers.

In the electronic device according to various embodiments of the disclosure, the processor may be configured to receive identification information of a BS connected to the electronic device or a BS adjacent to the electronic device, and select a second server to be accessed, based on comparison between identification information of BSs adjacent to the second servers included in the information related to the locations of the second servers and identification information of the BS connected or adjacent to the electronic device.

In the electronic device according to various embodiments of the disclosure, the processor may be configured to, in response to identification that the identification information of the BS connected or adjacent to the electronic device matches the identification information of the BS adjacent to the second server, determine the second server having the matching identification information as the second server to be accessed.

In the electronic device according to various embodiments of the disclosure, the processor may be configured to identify a round trip time (RTT) between the second server and the electronic device in response to identification that the identification information of the BS connected or adjacent to the electronic device does not match the identification information of the BS adjacent to the second server and determine a second server having a shortest value among the identified RTTs as the second server to be accessed.

In the electronic device according to various embodiments of the disclosure, the processor may be configured to identify a service radius of the second server included in the information related to the locations of the second servers and select the second server in response to identification that the location of the electronic device is included in the service radius of the second server.

In the electronic device according to various embodiments of the disclosure, the processor may be configured to, in response to movement of the electronic device, select a second server to be accessed, based on information on a changed location of the electronic device and the information related to the locations of the second servers.

An electronic device according to various embodiments of the disclosure may include a memory configured to store an application and/or an edge enabler client (EEC), a communication circuit used for connections between the electronic device, and a first server, a plurality of second servers, and/or third servers existing outside the electronic device, through a base station (BS), and a processor, and the application may be configured to perform one or more services corresponding to an application, which can be executed in the third server, in the electronic device, and the processor may be configured to receive access information of the second servers for access to the second servers from the first server, receive access information of third servers from each of a plurality of second servers accessed, based on the access information of the second servers, select a third server to be accessed, based on information related to locations of the third servers and information related to a location of the electronic device in response to the information related to the locations of the third servers included in the access information of the third servers, and access the selected server to perform the service.

In the electronic device according to various embodiments of the disclosure, the processor may be configured to select a third server closest to the electronic device from among the plurality of third servers, based on information related to locations of the third servers and information related to a location of the electronic device.

In the electronic device according to various embodiments of the disclosure, the processor may be configured to select a third server to be accessed, based on information related to the location of the second server and information related to the location of the electronic device in response to the information related to the location of the second server included in the access information of the second server.

In the electronic device according to various embodiments of the disclosure, the processor may be configured to select a third server to be accessed, based on access information of the third server included in the access information of the third server provided by the second server closest to the electronic device.

Figure 10:
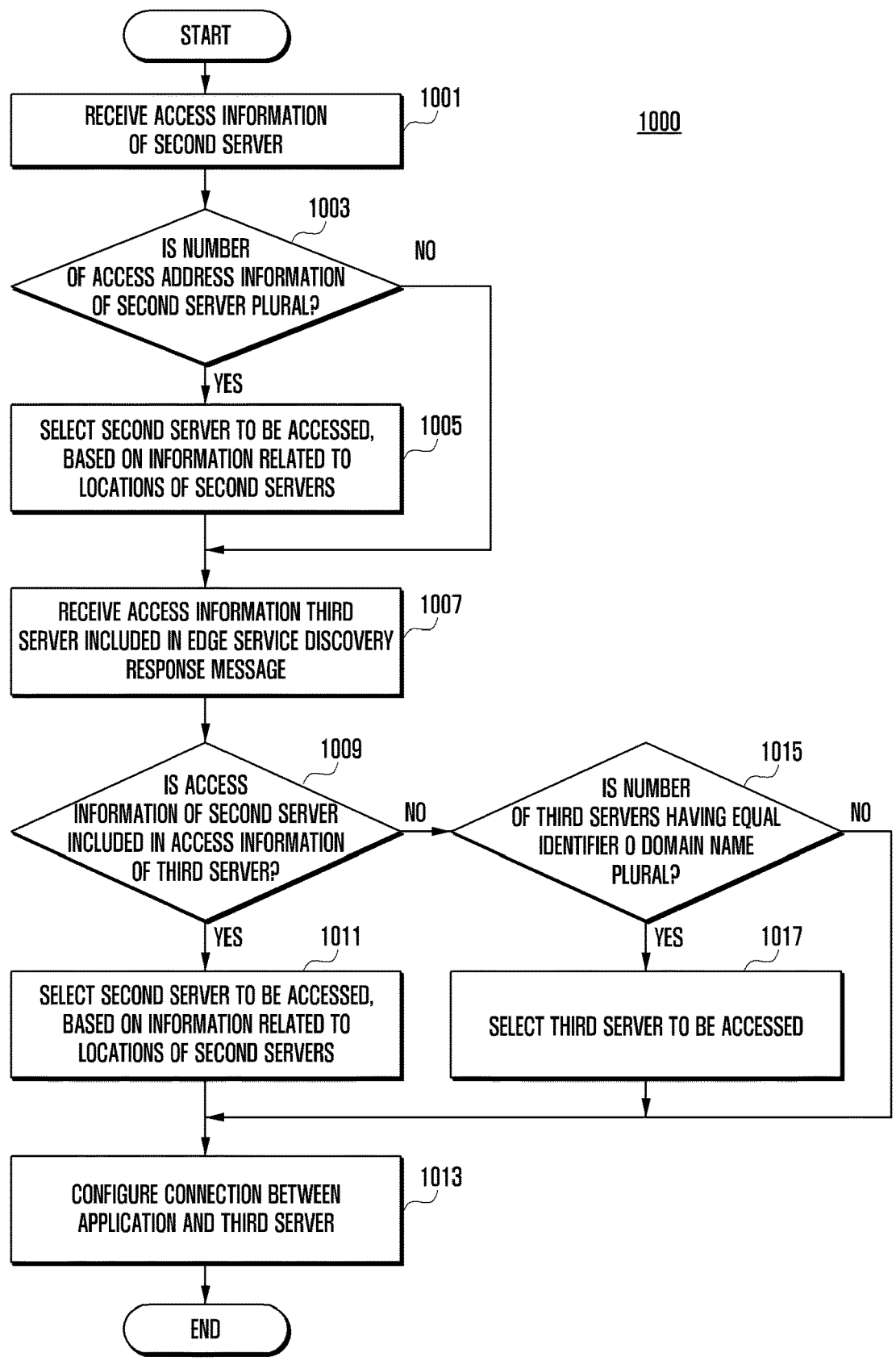
FIG. 10 is a flowchart illustrating a method of operating an electronic device according to an embodiment of the disclosure.

FIG. 10 is an operation flowchart illustrating a method 1000 of operating an electronic device according to an embodiment of the disclosure.

Referring to FIG. 10, in operation 1001, an electronic device (for example, the electronic device 400 of FIG. 4A) may receive access information of a second server (for example, the second server 520-a or 520-b of FIG. 4B).

According to various embodiments of the disclosure, the electronic device 400 may perform an operation of making the connection with the first server 510 on the basis of access information of the first server 510 received from a core network (for example, the core network 420 of FIG. 4A). In another embodiment, the electronic device 400 may perform an operation of making the connection with the first server 510 on the basis of access information of the first server 510 stored in the electronic device (for example, the memory 130 and/or a SIM card (for example, the subscriber identification module 196 of FIG. 1). The electronic device 400 may transmit identification information of the electronic device 400 (for example, an international mobile subscriber identify (IMSI) and/or a generic public subscription identifier (GPSI) of the electronic device 400) to the first server 510, and the first server 510 may authenticate the electronic device 400 on the basis of the identification information of the electronic device 400.

According to various embodiments of the disclosure, after completing the connection with the first server 510, the electronic device 400 may perform a provisioning procedure for an edge service. The provisioning procedure may include an operation of transmitting a signal making a request for access information of the second server 520-a or 520-b to the first server 510.

According to various embodiments of the disclosure, in reception of an access information request for the second server 520-a or 520-b, the first server 510 may transmit access information of the plurality of second servers 520-a or 520-b connected to the first server 510.

According to various embodiments of the disclosure, the first server 510 may transmit access information of the second server 520 (for example, at least one of an identifier of the second server 520-a or 520-b, URI information of the second server 520-*a* or 520-*b*, domain information of the second server 520-*a* or 520-*b*, IP address information of the second server 520-*a* or 520-*b*, access point name (APN) information corresponding to a dedicated public data network (PDN) or a packet data unit (PDU) when the dedicated PDN of the edge network system 500 or a PDU session exists, and/or data network name (DNN) information and/or information (for example, a token) used for verification for the valid connection of the second server 520-*a* or 520-*b*) to the electronic device 400.

According to various embodiments of the disclosure, in operation 1003, the electronic device 400 may identify whether the number of pieces of access address information of the second server 520-*a* or 520-*b* is plural.

According to various embodiments of the disclosure, a situation in which the number of pieces of access address information of the second server 520-*a* or 520-*b* is plural may be a situation in which the number of second servers 520-*a* and 520-*b* (local EESs) which can be accessed through the first server 510 is plural.

According to various embodiments of the disclosure, a situation in which the number of pieces of access address information of the second server 520-*a* or 520-*b* is one may be a situation in which the second server which can be accessed through the first server 510 is a global EES or the number of local EESs which can be accessed through the first server 510 is one.

According to various embodiments of the disclosure, in response to identification that the number of pieces of access address information of the second server 520-*a* or 520-*b* is not plural, the electronic device 400 may perform operation 1007.

According to various embodiments of the disclosure, in operation 1005, in response to identification that the number of pieces of access address information of the second server 520-*a* or 520-*b* is plural, the electronic device 400 may select the second server to be accessed on the basis of information related to the location of the second server 520-*a* or 520-*b*.

According to various embodiments of the disclosure, access information of the second server 520-*a* or 520-*b* may include information related to the location of the second server (for example, the second server 520-*a* or 520-*b* of FIG. 4B).

The information related to the location of the second server 520-*a* or 520-*b* may include location information of the second server 520-*a* or 520-*b*. According to an embodiment, the location information of the second server 520-*a* or 520-*b* may include latitude and longitude of the second server 520-*a* or 520-*b*. According to an embodiment, the location information of the second server 520-*a* or 520-*b* may include a mobile country code indicating a country in which the second server 520-*a* or 520-*b* is located or a mobile network code indicating an operator of the second server 520-*a* or 520-*b*.

The information related to the location of the second server 520-*a* or 520-*b* may include an identifier which can indicate the location of the second server 520-*a* or 520-*b* According to an embodiment, the identifiers which can indicate the location of the second server 520-*a* or 520-*b* may be an identifier (cell ids) of the BS (for example, the BS 410-*a* or 410-*b* of FIG. 4B) connected to the second server 520-*a* or 520-*b* or the BS adjacent to the second server 520-*a* or 520-*b*, or a tracking area identification (TAIs) of the second server 520-*a* or 520-*b*.

The information related to the location of the second server 520-*a* or 520-*b* may include a service radius of the second server 520-*a* or 520-*b*.

According to various embodiments of the disclosure, the information related to the location of the second server 520-*a* or 520-*b* may be included in access information of the second servers 520.

According to various embodiments of the disclosure, in response to information related to the location of the second server 520-*a* or 520-*b* included in access information of the second server 520-*a* or 520-*b*, the electronic device 400 may select the second server to be accessed on the basis of the information related to the location of the second server 520-*a* or 520-*b* and the information related to the location of the electronic device 400.

According to various embodiments of the disclosure, in response to location information of the second server 520-*a* or 520-*b* included in the information related to the location of the second server 520-*a* or 520-*b*, the electronic device 400 may compare the location information of the electronic device with the location information of the second server 520-*a* or 520-*b* and select the second server 520-*a* closest to the electronic device 400 as the second server to be accessed. When a service radius of the second server 520-*a* or 520-*b* is included in the location information of the second server 520-*a* or 520-*b*, the electronic device 400 may select the second server 520-*a* included in the service radius of the second server 520-*a* or 520-*b* as the second server to be accessed.

According to various embodiments of the disclosure, in response to an identifier indicating the location of the second server 520-*a* or 520-*b* included in the information related to the location of the second server 520-*a* or 520-*b*, the electronic device 400 may compare the identifier of the BS 410-*b* connected to the electronic device 400 or the BS 410-*b* adjacent to the electronic device 400 with the identifier of the BS 410-*a* or 410-*b* connected to adjacent to the second server 520-*a* or 520-*b*. In response to identification that the identifiers match, the electronic device 400 may select the second server 520-*a* corresponding to the matching identifier as the second server to be accessed.

According to various embodiments of the disclosure, in response to the identifier indicating the location of the second server 520-*a* or 520-*b* included in the information related to the location of the second server 520-*a* or 520-*b*, the electronic device 400 may compare a TAI of the electronic device 400 with a TAI of the second server 520-*a* or 520-*b*. In response to identification that the TAIs match, the electronic device 400 may select the second server 520-*a* corresponding to the matching TAI as the second server to be accessed.

According to various embodiments of the disclosure, in response to the identifier indicating the country in which the second server 520-*a* or 520-*b* is located or the operator thereof included in the information related to the location of the second server 520-*a* or 520-*b*, the EEC 503 may compare an MCC or (MNC) of the electronic device 400 with an MCC (or MNC) of the second server 520-*a* or 520-*b*. The electronic device 400 may select the second server 520-*a* having the matching MCC (or MNC) as the second server to be accessed.

According to various embodiments of the disclosure, the electronic device 400 may make the connection with the second server 520-*a* or 520-*b* on the basis of access address information of the second server 520-*a* or 520-*b* received from the first server 510 and measure a round trip time (RTT) of each of the second servers 520-*a* and 520-*b*. The electronic device 400 may transmit a test signal (for example, a ping signal) to each second server 520-*a* or 520-*b* and measure the RTT on the basis of a time at which a response signal corresponding to the test signal is received. The electronic device 400 select the second server 520-*a* having the shortest RTT among the plurality of second servers 520-*a* and 520-*b* as the second server to be accessed.

According to various embodiments of the disclosure, when an IP address of the third server 530-*a* or 530-*b* is included in the access address information of the third server 530-*a* or 530-*b* received from the first server 510, the electronic device 400 may select the third server 530-*a* closest to the electronic device 400 on the basis of the IP address. According to an embodiment, the electronic device 400 may compare an IP subnet prefix generated on the basis of the IP address of the third server 530-*a* or 530-*b* with an IP subnet prefix of the electronic device 400 and select the third server 530-*a* having the IP subnet prefix which is the same as the IP subnet prefix of the electronic device 400 as the second server to be accessed.

According to various embodiments of the disclosure, in operation 1007, the electronic device 400 may receive access information of the third server 530-*a* or 530-*b* included in an edge service discovery response message.

According to various embodiments of the disclosure, in operation 1009, the electronic device 400 may identify whether access information of the second server 520-*a* or 520-*b* is included in the access information of the third server 530-*a* or 530-*b*.

According to various embodiments of the disclosure, when the access information of the second server 520-*a* or 520-*b* is included in the access information of the third server 530-*a* or 530-*b*, the second server connected through operation 1005 and operation 1007 may be a global EES.

According to various embodiments of the disclosure, in response to identification (operation 1009-Y) that the access information of the second server 520-*a* or 520-*b* is included in the access information of the third server 530-*a* or 530-*b*, the electronic device 400 may select the second server to be accessed on the basis of information related to the location of the second server 520-*a* or 520-*b* in operation 1011.

According to various embodiments of the disclosure, the electronic device 400 may transmit an edge service discovery message making a request for access information of the third server 530-*a* from the selected second server 520-*a*. The electronic device 400 may receive access information of the third server 530-*a* included in an edge service discovery response message transmitted by the second server 520-*a* and configure the connection between the application and the third server 530-*a* on the basis of the access information of the third server 530-*a*.

According to various embodiments of the disclosure, in operation 1013, the electronic device 400 may configure the connection between the application and the third server 530-*a* or 530-*b*.

According to various embodiments, in response to identification (operation 1009-N) that the access information of the second server 520-*a* or 520-*b* is not included in the access information of the third server 530-*a* or 530-*b*, the electronic device 400 may identify the number of third servers having the same identifier (ACID) or domain name (FQDN) is plural in the access information of the third server 530-*a* or 530-*b* in operation 1015.

According to various embodiments of the disclosure, in response to identification that the number of third servers having the same identifier (ACID) or domain name (FQDN) is not plural in the access information of the third server 530-*a* or 530-*b* (operation 1015-N), the electronic device 400 may configure the connection between the application 505 and the third server 530-*a* or 530-*b*.

According to various embodiments of the disclosure, in response to identification (operation 1015-Y) that the number of third servers having the same identifier (ACID) or domain name (FQDN) is plural in the access information of the third server 530-*a* or 530-*b*, the electronic device 400 may select the third service to be accessed in operation 1017.

According to various embodiments of the disclosure, the electronic device 400 may select the third server 530-*a* or 530-*b* to be accessed on the basis of comparison between identification information of the application 505 and the identifier (ACID) of the application of the third server 530-*a* or 530-*b* included in the access information of the third server 530-*a*.

According to various embodiments of the disclosure, the third server 530-*a* or 530-*b* may be a server which can provide the same service (for example, a service using the same application) which can be used by the application 505. For example, when the identifier (ACID) of the application of the third server 530-*a* or 530-*b* included in the access information of the third server is the same as the identification information of the application 506, all of the third servers 530-*a* and 530-*b* may be servers which can provide the service available by the application 505.

In response to identification that the identifier (ACID) of the application of the third server 530-*a* or 530-*b* included in the access information of the third server is the same as the identification information of the application 506, the electronic device 400 may select the third server 530-*a* or 530-*b* to be accessed on the basis of information related to the location of the third server 530-*a* or 530-*b*.

According to various embodiments of the disclosure, in response to location information of the third server 530-*a* or 530-*b* included in the information related to the location of the third server 530-*a* or 530-*b*, the electronic device 400 may compare the location information of the electronic device with the location information of the third server 530-*a* or 530-*b* and select the third server 530-*a* closest to the electronic device 400 as the third server to be accessed. When a service radius of the third server 530-*a* or 530-*b* is included in the location information of the third server 530-*a* or 530-*b*, the electronic device 400 may select the third server 530-*a* included in the service radius of the third server 530-*a* or 530-*b* as the third server to be accessed.

According to various embodiments of the disclosure, in response to an identifier indicating the location of the third server 530-*a* or 530-*b* included in the information related to the location of the third server 530-*a* or 530-*b*, the electronic device 400 may compare the identifier of the BS 410-*b* connected to the electronic device 400 or the BS 410-*b* adjacent to the electronic device 400 with the identifier of the BS 410-*a* or 410-*b* connected to adjacent to the third server 530-*a* or 530-*b*. In response to identification that the identifiers match, the electronic device 400 may select the third server 530-*a* corresponding to the matching identifier as the third server to be accessed.

According to various embodiments of the disclosure, in response to the identifier indicating the location of the third server 530-*a* or 530-*b* included in the information related to the location of the third server 530-*a* or 530-*b*, the electronic device 400 may compare a TAI of the electronic device 400 with a TAI of the third server 530-*a* or 530-*b*. In response to identification that the TAIs match, the electronic device 400 may select the third server 530-*a* corresponding to the matching TAI as the third server to be accessed.

According to various embodiments of the disclosure, in response to the identifier indicating the country in which the third server 530-*a* or 530-*b* is located or the operator thereof included in the information related to the location of the third server 530-*a* or 530-*b*, the EEC 503 may compare an MCC or (MNC) of the electronic device 400 with an MCC (or MNC) of the third server 530-*a* or 530-*b*. The electronic device 400 may select the third server 530-*a* having the matching MCC (or MNC) as the third server to be accessed.

According to various embodiments of the disclosure, the electronic device 400 may make the connection with the third server 530-*a* or 530-*b* on the basis of access address information of the third server 530-*a* or 530-*b* received from the first server 510 and measure a round trip time (RTT) between the third server 530-*a* or 530-*b* and the electronic device 400. According to an embodiment, the electronic device 400 may transmit a test signal (for example, a ping signal) to each third server 530-*a* or 530-*b* and measure the RTT on the basis of a time at which a response signal corresponding to the test signal is received. The electronic device 400 select the third server 530-*a* having the shortest RTT among the plurality of third servers 530-*a* and 530-*b* as the second server to be accessed.

According to various embodiments of the disclosure, when an IP address of the third server 530-*a* or 530-*b* is included in the access address information of the third server 530-*a* or 530-*b* received from the second server 520-*a*, the electronic device 400 may select the third server 530-*a* closest to the electronic device 400 on the basis of the IP address. According to an embodiment, the electronic device 400 may compare an IP subnet prefix generated on the basis of the IP address of the third server 530-*a* or 530-*b* with an IP subnet prefix of the electronic device 400 and select the third server 530-*a* having the IP subnet prefix which is the same as the IP subnet prefix of the electronic device 400 as the second server to be accessed.

According to various embodiments of the disclosure, when an IP address of the third server 530-*a* or 530-*b* is not included in the access address information of the third server 530-*a* or 530-*b* received from the second server 520-*a*, the electronic device 400 may select the third server from among the third servers 530-*a* and 530-*b* on the basis of information related to the location of the second server 520-*a* or 520-*b*. In consideration of the location of the third server 530-*a* or 530-*b* physically close to the second server 520-*a* or 520-*b*, the electronic device 400 may select the third server 530-*a* or 530-*b* to be accessed on the basis of information related to the location of the second server 520-*a* or 520-*b* rather than information related to the location of the third server 530-*a* or 530-*b*.

According to various embodiments of the disclosure, the electronic device 400 may configure the connection between the selected third server 530-*a* and the application 505.

According to various embodiments of the disclosure, a method by which the electronic device 400 configures the application 505 to make the connection with the third server 520-*a* may include a method of transferring access information of the third server 530-*a* to the application 505 and allowing the application 505 to communicate with an application installed in the third server 530-*a*. For example, the electronic device 400 may transmit a response message including access address information of the server application (for example, IP addresses of the server applications 531 and 533) to the application 505 in response to a domain name system (DNS) query (question) request from the client application 505. The application 505 may configure communication with the application of the third server 530-*a* on the basis of access information of the server application.

According to various embodiments of the disclosure, the electronic device 400 (or the processor 501) may configure a dedicated network channel for the connection between the application 505 and the third server 530-*a*. For example, the processor 501 may control a communication circuit (for example, the wireless communication module 192 of FIG. 1) to generate a first channel which is a predetermined network interface (for example, to establish a PDU session dedicated for the application 505 or to access a dedicated DNN gateway). The electronic device 400 (or the processor 501) may control the wireless communication module 192 such that the applications 505 transmit or receive data through the predetermined network interface.

According to various embodiments of the disclosure, the application 505 may perform a service using the third server 530-*a* by transmitting or receiving application data to or from the connected third server 530-*a* in operation 617.

Figure 11:
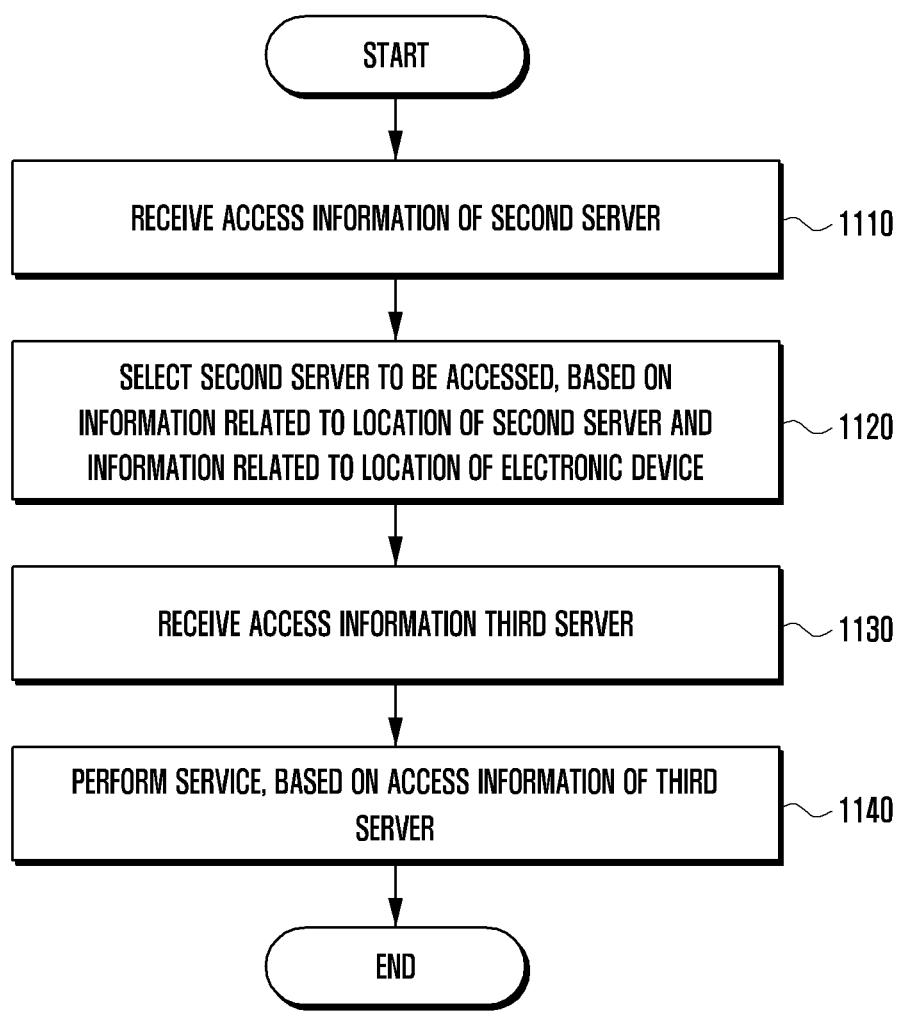
FIG. 11 is a flowchart illustrating a method of operating an electronic device according to an embodiment of the disclosure.

FIG. 11 is an operation flowchart illustrating a method 1100 of operating an electronic device according to an embodiment of the disclosure.

Referring to FIG. 11, in operation 1110, an electronic device (for example, the electronic device 400 of FIG. 4A) may receive access information of a second server (for example, the second server 520-*a* or 520-*b* of FIG. 4B) from a first server (for example, the first server 510 of FIG. 4A).

According to various embodiments of the disclosure, the first server 510 may transmit access information of the second server 520 (for example, at least one of an identifier of the second server 520-*a* or 520-*b*, URI information of the second server 520-*a* or 520-*b*, domain information of the second server 520-*a* or 520-*b*, IP address information of the second server 520-*a* or 520-*b*, access point name (APN) information corresponding to a dedicated public data network (PDN) or a packet data unit (PDU) when the dedicated PDN of the edge network system 500 or a PDU session exists, and/or data network name (DNN) information and/or information (for example, a token) used for verification for the valid connection of the second server 520-*a* or 520-*b*) to the electronic device 400.

According to various embodiments of the disclosure, access information of the second server 520-*a* or 520-*b* may include information related to the location of the second server (for example, the second server 520-*a* or 520-*b* of FIG. 4B).

The information related to the location of the second server 520-*a* or 520-*b* may include the location information of the second server 520-*a* or 520-*b*. According to an embodiment, the location information of the second server 520-*a* or 520-*b* may include latitude and longitude of the second server 520-*a* or 520-*b*. According to an embodiment, the location information of the second server 520-*a* or 520-*b* may include a mobile country code indicating a country in which the second server 520-*a* or 520-*b* is located or a mobile network code indicating an operator of the second server 520-*a* or 520-*b*.

The information related to the locations of the second server 520-*a* or 520-*b* may include an identifier which can indicate the location of the second server 520-*a* or 520-*b*. According to an embodiment, the identifier which can indicate the location of the server 520-*a* or 520-*b* may be an identifier (cell id) of the BS (for example, the BS 410-*a* or 410-*b* of FIG. 4B) connected to the second server 520-*a* or 520-*b* or the BS adjacent to the second server 520-*a* or 520-*b*, or a tracking area identification (TAI) of the second server 520-*a* or 520-*b*.

The information related to the location of the second server 520-a or 520-b may include a service radius of the second server 520-a or 520-b.

According to various embodiments of the disclosure, in operation 1120, the electronic device 400 may select the second server to be accessed on the basis of information related to the location of the second server 520-a or 520-b and information related to the location of the electronic device 400.

According to various embodiments of the disclosure, in response to location information of the second server 520-a or 520-b included in the information related to the location of the second server 520-a or 520-b, the electronic device 400 may compare the location information of the electronic device with the location information of the second server 520-a or 520-b and select the second server 520-a closest to the electronic device 400 as the second server to be accessed. When a service radius of the second server 520-a or 520-b is included in the location information of the second server 520-a or 520-b, the electronic device 400 may select the second server 520-a included in the service radius of the second server 520-a or 520-b as the second server to be accessed.

According to various embodiments of the disclosure, in response to an identifier indicating the location of the second server 520-a or 520-b included in the information related to the location of the second server 520-a or 520-b, the electronic device 400 may compare the identifier of the BS 410-b connected to the electronic device 400 or the BS 410-b adjacent to the electronic device 400 with the identifier of the BS 410-a or 410-b connected to adjacent to the second server 520-a or 520-b. In response to identification that the identifiers match, the electronic device 400 may select the second server 520-a corresponding to the matching identifier as the second server to be accessed.

According to various embodiments of the disclosure, in response to the identifier indicating the location of the second server 520-a or 520-b included in the information related to the location of the second server 520-a or 520-b, the electronic device 400 may compare a TAI of the electronic device 400 with a TAI of the second server 520-a or 520-b. In response to identification that the TAIs match, the electronic device 400 may select the second server 520-a corresponding to the matching TAI as the second server to be accessed.

According to various embodiments of the disclosure, in response to the identifier indicating the country in which the second server 520-a or 520-b is located or the operator thereof included in the information related to the location of the second server 520-a or 520-b, the electronic device 400 may compare an MCC or (MNC) of the electronic device 400 with an MCC (or MNC) of the second server 520-a or 520-b. The electronic device 400 may select the second server 520-a having the matching MCC (or MNC) as the second server to be accessed.

According to various embodiments of the disclosure, the electronic device 400 may make the connection with the second server 520-a or 520-b on the basis of access address information of the second server 520-a or 520-b received from the first server 510 and measure a round trip time (RTT) of each of the second servers 520-a and 520-b. Measurement of the RTT may be performed by the electronic device 400 while or before the electronic device 400 makes the connection with the second server 520-a or 520-b. The electronic device 400 may transmit a test signal (for example, a ping packet or a transmission control protocol (TCP) synchronize (SYN) packet) to each second server 520-a or 520-b and measure the RTT on the basis of a time at which a response signal (for example, a ping response packet or a TCP SYN-ACK packet) corresponding to the test signal is received. The electronic device 400 may select the second server 520-a having the shortest RTT among the plurality of second servers 520-a and 520-b as the second server to be accessed.

According to various embodiments of the disclosure, when an IP address of the third server 530-a or 530-b is included in the access address information of the third server 530-a or 530-b received from the second server 520-a, the electronic device 400 may select the third server 530-a closest to the electronic device 400 on the basis of the IP address. According to an embodiment, the electronic device 400 may compare an IP subnet prefix generated on the basis of the IP address of the third server 530-a or 530-b with an IP subnet prefix of the electronic device 400 and select the third server 530-a having the IP subnet prefix which is the same as the IP subnet prefix of the electronic device 400 as the second server to be accessed.

According to various embodiments of the disclosure, in operation 1130, the electronic device 400 may receive access information of the third server (for example, the third server 530-a of FIG. 4B) from the selected second server (520-a).

According to various embodiments of the disclosure, the electronic device 400 may transmit an edge service discovery request message to the selected second server 520-a. The electronic device 400 may perform an access procedure with the third server 530-a by using access information of the third server 530-a included in an edge service discovery response message transmitted by the second server 520-a.

According to various embodiments of the disclosure, the EEC 503 may configure the connection between the application 505 and the selected third server 530-a.

According to various embodiments, a method by which the EEC 503 configures the application 505 to make the connection with the third server 530-a may include a method of transferring access information of the third server 530-a to the application 505 and configuring the application 506 to communication with the application installed in the third server 530-a. For example, the EEC 503 may transmit a response message including access address information of the server application (for example, IP addresses of the server applications 531 and 533) to the application 505 in response to a domain name system (DNS) query (question) request from the client application 505. The application 505 may configure communication with the application of the third server 530-a on the basis of access information of the server application.

According to various embodiments of the disclosure, the electronic device 400 (or the processor 501) may configure a dedicated network channel for the connection between the application 505 and the third server 530-a. For example, the processor 501 may control a communication circuit (for example, the wireless communication module 192 of FIG. 1) to generate a first channel which is a predetermined network interface (for example, to establish a PDU session dedicated for the application 505 or to access a dedicated DNN gateway). The electronic device 400 (or the processor 501) may control the wireless communication module 192 such that the applications 505 transmit or receive data through the predetermined network interface.

According to various embodiments of the disclosure, in operation 1140, the electronic device 400 may perform the service on the basis of the access information of the third server 530-a.

Figure 12:
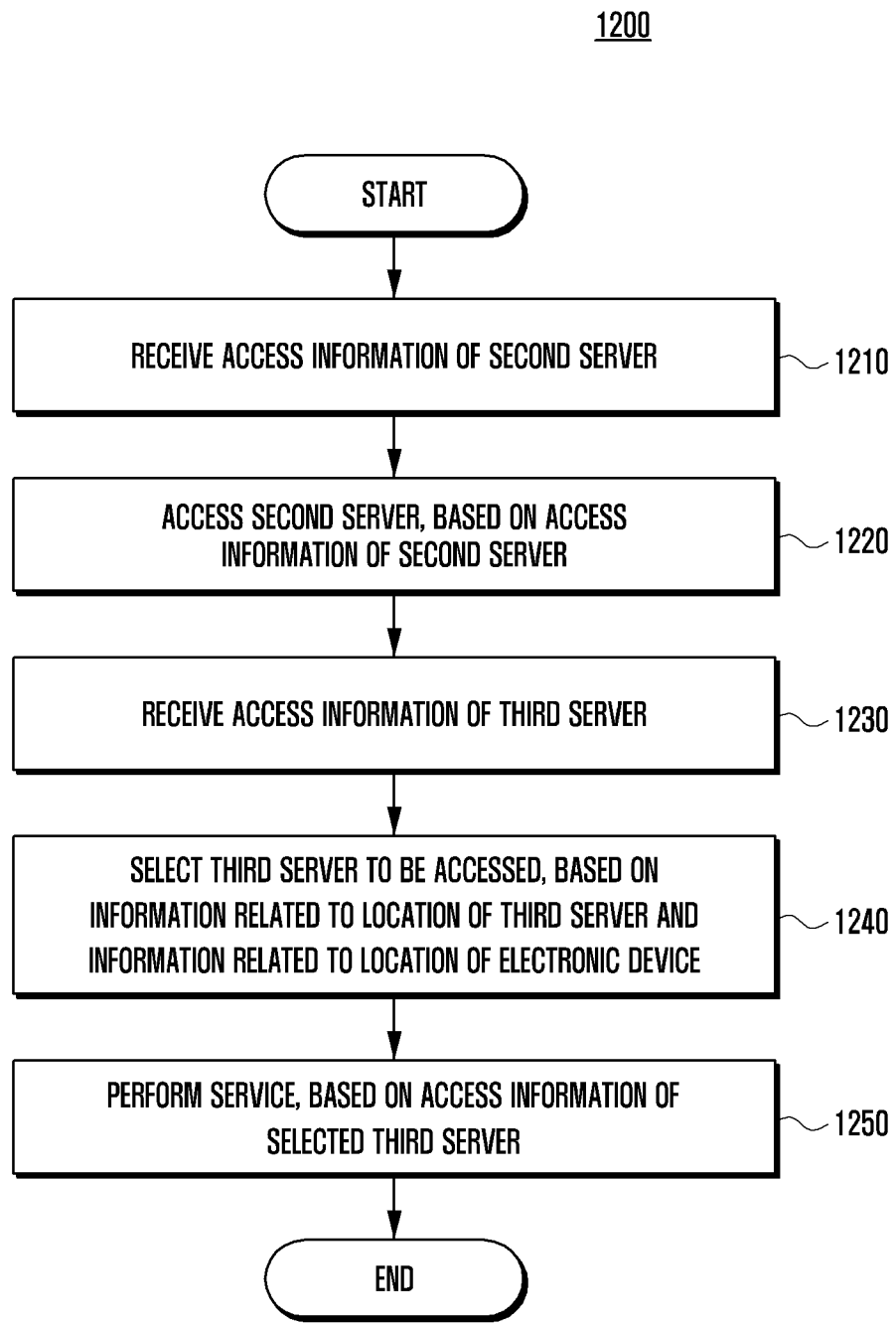
FIG. 12 is a flowchart illustrating a method of operating an electronic device according to an embodiment of the disclosure.

FIG. 12 is an operation flowchart illustrating a method 1200 of operating the electronic device according to an embodiment of the disclosure.

Referring to FIG. 12, in operation 1210, an electronic device (for example, the electronic device 400 of FIG. 4A) may receive access information of a second server (for example, the second server 520-*a* or 520-*b* of FIG. 4B) from a first server (for example, the first server 510 of FIG. 4A).

According to various embodiments of the disclosure, the electronic device 400 may transmit a signal making a request for access information of the second server 520-*a* or 520-*b* (for example, the second server 520 of FIG. 5) to the first server (for example, the first server 510 of FIG. 5). In response to reception of the access information request from the second server 520-*a* or 520-*b*, the first server 510 may transmit the access information of a plurality of second servers 520-*a* or 520-*b* connected to the first server 510.

According to various embodiments of the disclosure, access information of the second server 520-*a* or 520-*b* may include at least one of an identifier of each of the plurality of second servers 520-*a* or 520-*b*, access address information of the plurality of second servers 520-*a* or 520-*b* (for example, IP address information of the second server 520-*a* or 520-*b*, domain information of the second server 520-*a* or 520-*b*, or URI information of the second server 520-*a* or 520-*b*).

According to various embodiments of the disclosure, in operation 1220, the electronic device 400 may access the second server 520-*a* or 520-*b* on the basis of the access information of the second server 520-*a* or 520-*b*.

According to various embodiments of the disclosure, in operation 1230, the electronic device 400 may receive access information of the third server 530-*a* or 530-*b* from the second server 520-*a* or 520-*b*.

According to various embodiments of the disclosure, the electronic device 400 may transmit an edge service discovery request message making a request for access information of the third server 530-*a* to the second server 520-*a* on the basis of the access information of the second server 520-*a*.

According to various embodiments of the disclosure, in response to reception of the edge service discovery request message, the electronic device 400 may transmit an edge service discovery response message including access information of at least one third server 530-*a* connected to the second server 520-*a* to the EEC 503.

According to various embodiments of the disclosure, access information of the third server 530-*a* may include an identifier (EASID) of the third server 530-*a*, identification information (ACID) of the application 505 installed in the electronic device 400, and/or (edge service) access address information of the third server 530-*b* (For example, at least one of a URI for edge service access to the third server 530-*a*, a domain name (FQDN) of the third server 530-*a*, and an IP address of the third server 530-*a*).

According to various embodiments of the disclosure, the access information of the third server 530-*a* may include information related to the location of the third server 530-*a*.

The information related to the location of the third server 530-*a* may include location information of the third server 530-*a*. According to an embodiment, the location information of the third server 530-*a* may include latitude and longitude of the third server 530-*a*. According to an embodiment, the location information of the third server 530-*a* may include a mobile country code indicating a country in which the third server 530-*a* is located or a mobile network code indicating an operator of the third server 530-*a*.

The information related to the location of the third server 530-*a* may include an identifier which can indicate the location of the third server 530-*a*. According to an embodiment, the identifier which can indicate the location of the third server 530-*a* may be an identifier (cell id) of a BS (for example, the BS 410-*a* of FIG. 4B) connected to the third server 530-*a* or a BS adjacent to the third server 530-*a*, or a tracking area identification (TAI) of the third server 530-*a*.

The information related to the location of the third server 530-*a* may include a service radius of the third server 530-*a*.

According to various embodiments of the disclosure, in operation 1240, the electronic device 400 may select the third server to be accessed on the basis of information related to the location of the third server 530-*a* or 530-*b* and information related to the location of the electronic device 400.

According to various embodiments of the disclosure, the electronic device 400 may select the third server 530-*a* or 530-*b* to be accessed on the basis of comparison between identification information of the application 505 and the identifier (ACID) of the application of the third server 530-*a* or 530-*b* included in the access information of the third server 530-*a*.

According to various embodiments of the disclosure, the third server 530-*a* or 530-*b* may be a server which can provide the same service (for example, a service using the same application) which can be used by the application 505. For example, when the identifier (ACID) of the application of the third server 530-*a* or 530-*b* included in the access information of the third server is the same as the identification information of the application 505, all of the third servers 530-*a* and 530-*b* may be servers which can provide the service available by the application 505.

In response to identification that the identifier (ACID) of the application of the third server 530-*a* or 530-*b* included in the access information of the third server is the same as the identification information of the application 506, the electronic device 400 may select the third server 530-*a* or 530-*b* to be accessed on the basis of information related to the location of the third server 530-*a* or 530-*b*.

According to various embodiments of the disclosure, in response to location information of the third server 530-*a* or 530-*b* included in the information related to the location of the third server 530-*a* or 530-*b*, the electronic device 400 may compare the location information of the electronic device with the location information of the second server 530-*a* or 530-*b* and select the third server 530-*a* closest to the electronic device 400 as the third server to be accessed. When a service radius of the third server 530-*a* or 530-*b* is included in the location information of the third server 530-*a* or 530-*b*, the electronic device 400 may select the third server 530-*a* included in the service radius of the third server 530-*a* or 530-*b* as the third server to be accessed.

According to various embodiments of the disclosure, in response to an identifier indicating the location of the third server 530-*a* or 530-*b* included in the information related to the location of the third server 530-*a* or 530-*b*, the electronic device 400 may compare the identifier of the BS 410-*b* connected to the electronic device 400 or the BS 410-*b* adjacent to the electronic device 400 with the identifier of the BS 410-*a* or 410-*b* connected to adjacent to the third server 530-*a* or 530-*b*. In response to identification that the identifiers match, the electronic device 400 may select the third server 530-*a* corresponding to the matching identifier as the third server to be accessed.

According to various embodiments of the disclosure, in response to the identifier indicating the location of the third server 530-*a* or 530-*b* included in the information related to the location of the third server 530-*a* or 530-*b*, the electronic device 400 may compare a TAI of the electronic device 400 with a TAI of the third server 530-*a* or 530-*b*. In response to identification that the TAIs match, the electronic device 400 may select the third server 530-*a* corresponding to the matching TAI as the third server to be accessed.

According to various embodiments of the disclosure, in response to the identifier indicating the country in which the third server 530-*a* or 530-*b* is located or the operator thereof included in the information related to the location of the third server 530-*a* or 530-*b*, the electronic device 400 may compare an MCC or (MNC) of the electronic device 400 with an MCC (or MNC) of the third server 530-*a* or 530-*b*. The electronic device 400 may select the third server 530-*a* having the matching MCC (or MNC) as the third server to be accessed.

According to various embodiments of the disclosure, the electronic device 400 may make the connection with the third server 530-*a* or 530-*b* on the basis of access address information of the third server 530-*a* or 530-*b* received from the first server 510 and measure a round trip time (RTT) between the third server 530-*a* or 530-*b* and the electronic device 400. According to an embodiment, the electronic device 400 may transmit a test signal (for example, a ping signal) to each third server 530-*a* or 530-*b* and measure the RTT on the basis of a time at which a response signal corresponding to the test signal is received. The electronic device 400 select the third server 530-*a* having the shortest RTT among the plurality of third servers 530-*a* and 530-*b* as the second server to be accessed.

According to various embodiments of the disclosure, when an IP address of the third server 530-*a* or 530-*b* is included in the access address information of the third server 530-*a* or 530-*b* received from the second server 520-*a*, the electronic device 400 may select the third server 530-*a* closest to the electronic device 400 on the basis of the IP address. According to an embodiment, the electronic device 400 may compare an IP subnet prefix generated on the basis of the IP address of the third server 530-*a* or 530-*b* with an IP subnet prefix of the electronic device 400 and select the third server 530-*a* having the IP subnet prefix which is the same as the IP subnet prefix of the electronic device 400 as the second server to be accessed.

According to various embodiments of the disclosure, when an IP address of the third server 530-*a* or 530-*b* is not included in the access address information of the third server 530-*a* or 530-*b* received from the second server 520-*a*, the electronic device 400 may select the third server from among the third servers 530-*a* and 530-*b* on the basis of information related to the location of the second server 520-*a* or 520-*b*. In consideration of the location of the third server 530-*a* or 530-*b* physically close to the second server 520-*a* or 520-*b*, the electronic device 400 may select the third server 530-*a* or 530-*b* to be accessed on the basis of information related to the location of the second server 520-*a* or 520-*b* rather than information related to the location of the third server 530-*a* or 530-*b*.

According to various embodiments of the disclosure, in operation 1250, the electronic device 400 may perform the service on the basis of the access information of the selected server 530-*a*.

According to various embodiments of the disclosure, the electronic device 400 may configure the connection between the selected third server 530-*a* and the application 505.

According to various embodiments of the disclosure, a method by which the electronic device 400 configures the application 505 to make the connection with the third server 530-*a* may include a method of transferring access information of the third server 530-*a* to the application 505 and allowing the application 505 to communicate with an application installed in the third server 530-*a*. For example, the electronic device 400 may transmit a response message including access address information of the server application (for example, IP addresses of the server applications 531 and 533) to the application 505 in response to a domain name system (DNS) query (question) request from the client application 505. The application 505 may configure communication with the application of the third server 530-*a* on the basis of access information of the server application.

According to various embodiments of the disclosure, the electronic device 400 (or the processor 501) may configure a dedicated network channel for the connection between the application 505 and the third server 530-*a*. For example, the processor 501 may control a communication circuit (for example, the wireless communication module 192 of FIG. 1) to generate a first channel which is a predetermined network interface (for example, to establish a PDU session dedicated for the application 505 or to access a dedicated DNN gateway). The electronic device 400 (or the processor 501) may control the wireless communication module 192 such that the applications 505 transmit or receive data through the predetermined network interface.

A method of operating an electronic device may include an operation of receiving access information of second servers for access to the second servers from a first server, an operation of selecting a second server to be accessed, based on information related to locations of the second servers and information related to a location of the electronic device in response to the information related to the locations of the second servers included in the access information of the second servers, and an operation of accessing the selected second server and perform a service.

In the method of operating the electronic device according to various embodiments of the disclosure, the operation of selecting the second server to be accessed may include an operation of selecting a second server closest to the electronic device from among the plurality of second servers, based on information related to locations of the second servers and information related to a location of the electronic device.

The method of operating the electronic device according to various embodiments of the disclosure may further include an operation of receiving access information of third servers from the selected second server, an operation of selecting a third server to be accessed, based on information related to locations of the third servers and the information related to the location of the electronic device in response to the information related to the locations of the third server included in the access information of the third servers, and an operation of accessing the selected third server to perform the service.

The method of operating the electronic device according to various embodiments of the disclosure may further include an operation of receiving the access information of the third servers from the selected second server, an operation of selecting a third server to be accessed, based on information related to a location of the second server and the information related to the location of the electronic device, and an operation of accessing the selected third server to perform the service.

In the electronic device according to various embodiments of the disclosure, the information related to the locations of the second servers may include at least one of location information of the second servers, identification information of BSs adjacent to the second servers, tracking area identifications (TAIs) of the second servers, and IP addresses of the second servers.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a communication circuit configured to communicate with an edge configuration server and edge enabler servers existing outside the electronic device;
  memory storing one or more computer programs including an edge enabler client (EEC), wherein the EEC configures an application to transmit data to an edge application server supporting an edge computing service or receive data from the edge application server; and
  one or more processors communicatively coupled to the memory and the communication circuit,
  wherein the EEC includes computer-executable instructions that, when executed by the one or more processors, cause the electronic device to:
    receive, from the edge configuration server, access information of a plurality of edge enabler servers connected to the edge configuration server for access to the plurality of edge enabler servers;
    access, by the EEC, an edge enabler server based on the access information of the plurality of edge enabler servers;
    receive, from the accessed edge enabler server, access information of a plurality of edge application servers, the access information of the plurality of edge application servers including information related to locations of the plurality of edge application servers, respectively;

select, by the EEC, an edge application server to be accessed from among the plurality of edge application servers based on the information related to the locations of the plurality of edge application servers and information related to a location of the electronic device, the information related to the location of the electronic device not being transmitted to the edge enabler server; and access, by the EEC, the edge application server to perform the edge computing service, wherein the information of the plurality of edge application servers includes tracking area information (TAI) of each of the plurality of edge application servers, and wherein the EEC further includes computer-executable instructions that, when executed by the one or more processors, cause the electronic device to:

compare a TAI of the electronic device and each of the tracking area information of each of the plurality of edge application servers, and select an edge application server corresponding to a TAI same with the TAI of the electronic device.

2. The electronic device of claim 1, wherein the EEC further includes computer-executable instructions that, when executed by the one or more processors, cause the electronic device to:

based on the information related to the locations of the plurality of edge application servers and the information related to the location of the electronic device, select the edge application server that is closest to the electronic device from among the plurality of edge application servers.

3. The electronic device of claim 1, wherein the EEC further includes computer-executable instructions that, when executed by the one or more processors, cause the electronic device to:

based on the access information of the plurality of edge enabler servers, perform a discovery operation with the plurality of edge application servers;

in response to identifying that more than one of the plurality of edge application servers support the edge computing service, select the edge enabler server that is closest to the electronic device from among the plurality of edge enabler servers based on the information related to a location of at least one of the plurality of edge enabler servers; and access the edge application server corresponding to the edge enabler server to perform the edge computing service.

4. The electronic device of claim 1, wherein the EEC further includes computer-executable instructions that, when executed by the one or more processors, cause the electronic device to:

in response to information related to the locations of the plurality of edge application servers being included in the access information of the plurality of edge application servers, select the edge application server to be accessed from among the plurality of edge application servers based on the information related to the locations of the plurality of edge application servers and the information related to the location of the electronic device; and access the edge application server to perform the edge computing service.

5. The electronic device of claim 1, wherein the EEC further includes computer-executable instructions that, when executed by the one or more processors, cause the electronic device to:

based on information related to a location of the edge enabler server and the information related to the location of the electronic device, select the edge application server to be accessed from among the plurality of edge application servers; and access the edge application server to perform the edge computing service.

6. The electronic device of claim 1, wherein the access information of the plurality of edge enabler servers includes information related to a location of at least one of the plurality of edge enabler servers, and wherein the information related to the location of at least one of the plurality of edge enabler servers further comprises at least one of location information of the plurality of edge enabler servers, identification information of base stations (BSs) adjacent to the plurality of edge enabler servers, tracking area identifications (TAIs) of the plurality of edge enabler servers, and internet protocol (IP) addresses of the plurality of edge enabler servers.

7. The electronic device of claim 6, wherein the EEC further includes computer-executable instructions that, when executed by the one or more processors, cause the electronic device to:

receive identification information of a first BS connected to the electronic device or a second BS adjacent to the electronic device; and based on a result of comparing the identification information of the BSs adjacent to the plurality of edge enabler servers included in the location information of the plurality of edge enabler servers and the identification information of the first BS connected to the electronic device or the second BS adjacent to the electronic device, select the edge enabler server to be accessed from among the plurality of edge enabler servers.

8. The electronic device of claim 7, wherein the EEC further includes computer-executable instructions that, when executed by the one or more processors, cause the electronic device to:

in response to identifying that the identification information of the first BS connected to the electronic device or the second BS adjacent to the electronic device matches identification information of one of the BSs adjacent to the plurality of edge enabler servers, determine the edge enabler server having the identification information matching the identification of the first BS or the second BS as the edge enabler server to be accessed.

9. The electronic device of claim 7, wherein the EEC further includes computer-executable instructions that, when executed by the one or more processors, cause the electronic device to:

in response to identifying that the identification information of the first BS connected to the electronic device or the second BS adjacent to the electronic device does not match identification information of one of the BSs adjacent to the plurality of edge enabler servers, identify a round trip time (RTT) between the edge enabler server and the electronic device; and determine the edge enabler server having a shortest value among the identified RTTs as the edge enabler server to be accessed.

10. The electronic device of claim 6, wherein the EEC further includes computer-executable instructions that, when executed by the one or more processors, cause the electronic device to:

identify an edge computing service radius of the edge enabler server included in the location information of the plurality of edge enabler servers; and in response to identifying that the location of the electronic device is included in the edge computing service radius of the edge enabler server, select the edge enabler server.

11. The electronic device of claim 1, wherein the EEC further include computer-executable instructions that, when executed by the one or more processors, cause the electronic device to:

in response to movement of the electronic device, select the edge application server to be accessed from among the plurality of edge application servers based on information on a changed location of the electronic device and the information related to the locations of the plurality of edge application servers.

12. The electronic device of claim 1, wherein the information related to the locations of the plurality of edge application servers includes at least one of a mobile country code indicating a country in which at least one of the plurality of edge application servers is located or a mobile network code indicating an operator of at least one of the plurality of edge application servers.

13. A method performed by an electronic device, the method comprising:

receiving, by the electronic device from an edge configuration server, access information of a plurality of edge enabler servers connected to the edge configuration server for access to the plurality of edge enabler servers;

accessing, by an edge enabler client (EEC) of the electronic device, an edge enabler server based on the access information of the plurality of edge enabler servers;

receiving, from the accessed edge enabler server, access information of a plurality of edge application servers, the access information of the plurality of edge application servers including information related to locations of the plurality of edge application servers, respectively;

selecting, by the EEC, an edge application server to be accessed from among the plurality of edge application servers, based on the information related to the locations of the plurality of edge application servers and information related to a location of the electronic device, the information related to the location of the electronic device not being transmitted to the edge enabler server; and accessing, by the electronic device, the edge application server to perform an edge computing service, wherein the information of the plurality of edge application servers includes tracking area information (TAI) of each of the plurality of edge application servers, and wherein the selecting of the edge application server comprises:

comparing a TAI of the electronic device and each of the tracking area information of each of the plurality of edge application servers; and selecting an edge application server corresponding to a TAI same with the TAI of the electronic device.

14. The method of claim 13, wherein the selecting of the edge enabler server to be accessed comprises:

based on the information related to the locations of the plurality of edge application servers and the information related to the location of the electronic device, selecting, by the electronic device, the edge application server that is closest to the electronic device from among the plurality of edge application servers.

15. The method of claim 13, further comprising:

in response to information related to the locations of the plurality of edge application servers being included in the access information of the plurality of edge application servers, selecting, by the electronic device, the edge application server to be accessed from among the plurality of edge application servers based on the information related to the locations of the plurality of edge application servers and the information related to the location of the electronic device; and accessing, by the electronic device, the edge application server to perform the edge computing service.

16. The method of claim 13, further comprising:

based on information related to a location of the edge enabler server and the information related to the location of the electronic device, selecting, by the electronic device, the edge application server to be accessed from among the plurality of edge application servers; and accessing, by the electronic device, the edge application server to perform the edge computing service.

* * * * *